US012748715B1

(12) United States Patent
Kurella et al.

(10) Patent No.: US 12,748,715 B1
(45) Date of Patent: *Sep. 29, 2026

(54) DIGITAL SWITCH BETWEEN CHIPLET DEVICES FOR HANDLING TRANSFORMER WORKLOADS

(71) Applicant: d-MATRIX CORPORATION, Santa Clara, CA (US)

(72) Inventors: Nithesh Kurella, Santa Clara, CA (US); Akhil Arunkumar, Santa Clara, CA (US); Jayaprakash Balachandran, Santa Clara, CA (US); Aayush Ankit, Santa Clara, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/950,623

(22) Filed: Nov. 18, 2024

(51) Int. Cl.
*G06F 13/40* (2006.01)

(52) U.S. Cl.
CPC ...... *G06F 13/4027* (2013.01); *G06F 13/4022* (2013.01)

(58) Field of Classification Search
CPC ............ G06F 13/4027; G06F 13/4022; G06F 13/4009; G06F 13/40; G06F 15/17306; G06F 15/17312; G06F 15/17318; G06F 15/163; G06F 17/16; G06F 13/12; H01L 23/5221; H05K 1/14; G06N 3/063; G06N 3/082; G06N 3/06; G06N 3/067; G06N 3/04; G06N 3/0464; G06N 3/0475; G06N 3/0495; G06N 3/0499
See application file for complete search history.

(56) References Cited

U.S. PATENT DOCUMENTS

| | | | |
|---|---|---|---|
| 11,488,935 B1 * | 11/2022 | Zaman ................ | H01L 23/5221 |
| 12,361,262 B1 * | 7/2025 | Uberti .................... | G06N 3/045 |
| 2023/0058355 A1 | 2/2023 | Hornung et al. | |

* cited by examiner

*Primary Examiner* — Idriss N Alrobaye
*Assistant Examiner* — Richard B Franklin
(74) *Attorney, Agent, or Firm* — Ogawa P.C.

(57) ABSTRACT

An active bridge module is present between substrates of an apparatus that accelerates AI computation workload. In response to an input, the active bridge module is configured to dynamically configure links between packages on the different substrates (e.g., PCIe cards). The active bridge module may comprise a network of digital switches. In certain embodiments, the active bridge module employs optical conversion with links comprising optical waveguides and/or optical cables. For a certain input, links can be dynamically established between packages on either of the adjacent PCIe boards (e.g., accommodating TP-4 tensor parallelism). For a different input to the module, links can be dynamically established between individual packages on each of the PCIe boards (e.g., accommodating TP-2 tensor parallelism). Embodiments are not limited to implementing parallelism of any particular degree, and can scale generally to implement parallel processing utilizing numbers of package(s) and/or their supporting substrate(s) that are greater than two.

20 Claims, 39 Drawing Sheets

1301

IMC – Matrix Multiply

| 384 | IMCs | | | |
|---|---|---|---|---|
| Cycles | AC1 | AC2 | AC3 | AC4 |
| 1,024 | K1 | K1 | K2 | K2 |
| 1,024 | K3 | K3 | K4 | K4 |
| 1,024 | K5 | K5 | K6 | K6 |
| 1,024 | Q1 | Q1 | Q2 | Q2 |
| 1,024 | Q3 | Q3 | Q4 | Q4 |
| 1,024 | Q5 | Q5 | Q6 | Q6 |
| 1,024 | QKT1 | QKT2 | QKT3 | QKT4 |
| 1,024 | QKT5 | QKT6 | V1 | V1 |
| 1,024 | V2 | V2 | V3 | V3 |
| 1,024 | V4 | V4 | V5 | V5 |
| 1,024 | V6 | V6 | XV1 | XV2 |
| 1,024 | XV3 | XV4 | XV5 | XV6 |

SIMD – Element Wise

| | SIMDs | | | |
|---|---|---|---|---|
| Cycles | SIMD1 | SIMD2 | SIMD3 | SIMD4 |
| 3,072 | Smax1 | Smax2 | Smax3 | Smax4 |
| 3,072 | Smax5 | Smax6 | | |

FIG. 13A

1302

| IMC – Matrix Multiply | | | | |
|---|---|---|---|---|
| 384 | IMCs | | | |
| Cycles | AC1 | AC2 | AC3 | AC4 |
| 1,024 | E1 | E1 | E1 | E1 |
| 1,024 | E1 | E1 | E1 | E1 |
| 1,024 | E2 | E2 | E2 | E2 |
| 1,024 | E2 | E2 | E2 | E2 |
| 1,024 | E3 | E3 | E3 | E3 |
| 1,024 | E3 | E3 | E3 | E3 |
| 1,024 | E4 | E4 | E4 | E4 |
| 1,024 | E4 | E4 | E4 | E4 |
| 1,024 | E5 | E5 | E5 | E5 |
| 1,024 | E5 | E5 | E5 | E5 |
| 1,024 | E6 | E6 | E6 | E6 |
| 1,024 | E6 | E6 | E6 | E6 |

| SIMD – Element Wise | | | | |
|---|---|---|---|---|
| | SIMDs | | | |
| Cycles | SIMD1 | SIMD2 | SIMD3 | SIMD4 |
| | | | | |
| 410 | GeLU1 | GeLU1 | GeLU1 | GeLU1 |
| 410 | GeLU1 | GeLU1 | GeLU1 | GeLU1 |
| 410 | GeLU2 | GeLU2 | GeLU2 | GeLU2 |
| 410 | GeLU2 | GeLU2 | GeLU2 | GeLU2 |
| 410 | GeLU3 | GeLU3 | GeLU3 | GeLU3 |
| 410 | GeLU3 | GeLU3 | GeLU3 | GeLU3 |
| 410 | GeLU4 | GeLU4 | GeLU4 | GeLU4 |
| 410 | GeLU4 | GeLU4 | GeLU4 | GeLU4 |
| 410 | GeLU5 | GeLU5 | GeLU5 | GeLU5 |
| 410 | GeLU5 | GeLU5 | GeLU5 | GeLU5 |
| 410 | GeLU6 | GeLU6 | GeLU6 | GeLU6 |
| 410 | GeLU6 | GeLU6 | GeLU6 | GeLU6 |

FIG. 13B

1303

| IMC – Matrix Multiply | | | | |
|---|---|---|---|---|
| 384 | IMCs | | | |
| Cycles | AC1 | AC2 | AC3 | AC4 |
| 1,024 | F1 | F1 | F1 | F1 |
| 1,024 | F1 | F1 | F1 | F1 |
| 1,024 | F2 | F2 | F2 | F2 |
| 1,024 | F2 | F2 | F2 | F2 |
| 1,024 | F3 | F3 | F3 | F3 |
| 1,024 | F3 | F3 | F3 | F3 |
| 1,024 | F4 | F4 | F4 | F4 |
| 1,024 | F4 | F4 | F4 | F4 |
| 1,024 | F5 | F5 | F5 | F5 |
| 1,024 | F5 | F5 | F5 | F5 |
| 1,024 | F6 | F6 | F6 | F6 |
| 1,024 | F6 | F6 | F6 | F6 |

| SIMD – Element Wise | | | | |
|---|---|---|---|---|
| | SIMDs | | | |
| Cycles | SIMD1 | SIMD2 | SIMD3 | SIMD4 |
| | | | | |
| | F-b-1 | F-b-1 | F-b-1 | F-b-1 |
| 205 | LRN1 | LRN1 | LRN1 | LRN1 |
| | | | | |
| | F-b-2 | F-b-2 | F-b-2 | F-b-2 |
| 205 | LRN2 | LRN2 | LRN2 | LRN2 |
| | | | | |
| | F-b-3 | F-b-3 | F-b-3 | F-b-3 |
| 205 | LRN3 | LRN3 | LRN3 | LRN3 |
| | | | | |
| | F-b-4 | F-b-4 | F-b-4 | F-b-4 |
| 205 | LRN4 | LRN4 | LRN4 | LRN4 |
| | | | | |
| | F-b-5 | F-b-5 | F-b-5 | F-b-5 |
| 205 | LRN5 | LRN5 | LRN5 | LRN5 |
| | | | | |
| | F-b-6 | F-b-6 | F-b-6 | F-b-6 |
| 205 | LRN6 | LRN6 | LRN6 | LRN6 |

FIG. 13C

DIGITAL SWITCH BETWEEN CHIPLET DEVICES FOR HANDLING TRANSFORMER WORKLOADS

BACKGROUND OF THE INVENTION

The present invention relates generally to integrated circuit (IC) devices and artificial intelligence (AI). More specifically, the present invention relates to methods and device structures for accelerating computing workloads in transformer-based models (a.k.a. transformers).

The transformer has been the dominant neural network architecture in the natural language processing (NLP) field, and its use continues to expand into other machine learning applications. The original Transformer was introduced in the paper "Attention is all you need" (Vaswani et al., 2017), which sparked the development of many transformer model variations, such as the generative pre-trained transformer (GPT) and the bidirectional encoder representations from transformers (BERT) models. Such transformers have significantly outperformed other models in inference tasks by their use of a self-attention mechanism that avoids recursion and allows for easy parallelism. On the other hand, the transformer workloads are very computationally intensive and have high memory requirements, and have been plagued as being time-intensive and inefficient.

Most recently, NLP models have grown by a thousand times in both model size and compute requirements. For example, it can take about 4 months for 1024 graphics processing units (GPUs) to train a model like GPT-3 with 175 billion parameters. New NLP models having a trillion parameters are already being developed, and multi-trillion parameter models are on the horizon. Such rapid growth has made it increasingly difficult to serve NLP models at scale.

From the above, it can be seen that improved devices and method to accelerate compute workloads for transformers are highly desirable.

BRIEF SUMMARY OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

Each of the server systems includes a plurality of multiprocessors, and each multiprocessor includes at least a first central processing unit (CPU) and a second CPU. The first CPU is coupled the second CPU via a point-to-point interconnect, and the first CPU and the second CPU are each coupled to a plurality of memory devices. Further, the first CPU is also coupled a network interface controller (NIC) device. The server system also includes a plurality of connected switch devices coupled to the plurality of multiprocessors such that each of the CPUs of each multiprocessor is coupled to a different switch device. And, each of the switch devices is coupled to a plurality of AI accelerator apparatuses. The server system can be configured as a multi-node system with a plurality of server nodes, each of which can include the server system configuration discussed previously.

The apparatus includes one or more chiplets, each of which includes a plurality of tiles. Each tile includes a plurality of slices, a CPU, and a hardware dispatch device. Each slice can include a digital in-memory compute (DIMC) device configured to perform high throughput computations. In particular, the DIMC device can be configured to accelerate the computations of attention functions for transformers applied to machine learning applications. A single input multiple data (SIMD) device configured to further process the DIMC output and compute softmax functions for the attention functions. The chiplet can also include die-to-die (D2D) interconnects, a peripheral component interconnect express (PCIe) bus, a dynamic random access memory (DRAM) interface, and a global CPU interface to facilitate communication between the chiplets, memory and a server or host system.

In an example, the present invention provides an active bridge module that is present between PCIe cards of the AI accelerator apparatus. According to a particular embodiment, the active bridge module comprises a network of digital switches. In certain embodiments, the active bridge module employs optical conversion with links comprising optical waveguides and/or optical cables.

In response to an input signal, the active bridge module is configured to dynamically configure links between packages on the different PCIe cards. For a certain input to the active bridge module, links can be dynamically established between all packages on either of the adjacent PCIe boards (e.g., to accommodate TP-4 tensor parallelism). For a different input, links can be dynamically established between individual packages on each of the PCIe boards (e.g., to accommodate TP-2 tensor parallelism in an efficient manner). It noted that embodiments are not limited to implementing particular types of parallelism (e.g., TP-4; TP-2) with efficiency. Rather, embodiments can scale generally to implement parallel processing utilizing larger numbers of package(s) and/or card(s).

Embodiments of an AI accelerator and chiplet device architecture and its related methods may provide one or more benefits. With modular chiplets, the AI accelerator apparatus can be easily scaled to accelerate the workloads for transformers of different sizes. The DIMC configuration within the chiplet slices also improves computational performance and reduces power consumption by integrating computational functions and memory fabric. Further, embodiments of the AI accelerator apparatus can allow for quick and efficient mapping from the transformer to enable effective implementation of AI applications.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 13A-13C are simplified tables illustrating data flow through the IMC and single input multiple data (SIMD) modules according to an example of the present invention.

DETAILED DESCRIPTION OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

Currently, the vast majority of NLP models are based on the transformer model, such as the bidirectional encoder representations from transformers (BERT) model, BERT Large model, and generative pre-trained transformer (GPT) models such as GPT-2 and GPT-3, etc. However, these transformers have very high compute and memory requirements. According to an example, the present invention provides for an apparatus using chiplet devices that are configured to accelerate transformer computations for AI applications. Examples of the AI accelerator apparatus are shown in FIGS. 1A and 1B.

Figure 1A:
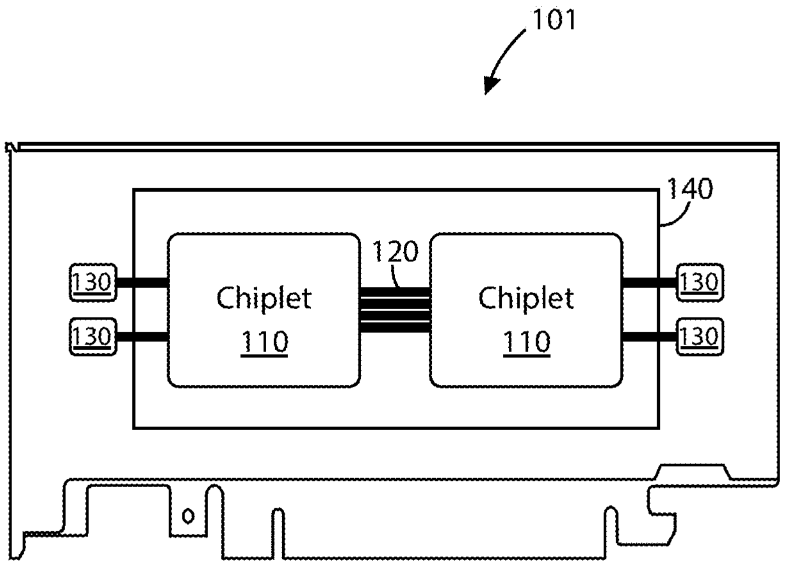
FIGS. 1A-1B are simplified block diagrams illustrating AI accelerator apparatuses according to examples of the present invention.

FIG. 1A illustrates a simplified AI accelerator apparatus 101 with two chiplet devices 110. As shown, the chiplet devices 110 are coupled to each other by one or more die-to-die (D2D) interconnects 120. Also, each chiplet device 110 is coupled to a memory interface 130 (e.g., static random access memory (SRAM), dynamic random access memory (DRAM), synchronous dynamic RAM (SDRAM), or the like). The apparatus 101 also includes a substrate member 140 that provides mechanical support to the chiplet devices 110 that are configured upon a surface region of the substrate member 140. The substrate can include interposers, such as a silicon interposer, glass interposer, organic interposer, or the like. The chiplets can be coupled to one or more interposers, which can be configured to enable communication between the chiplets and other components (e.g., serving as a bridge or conduit that allows electrical signals to pass between internal and external elements).

Figure 1B:
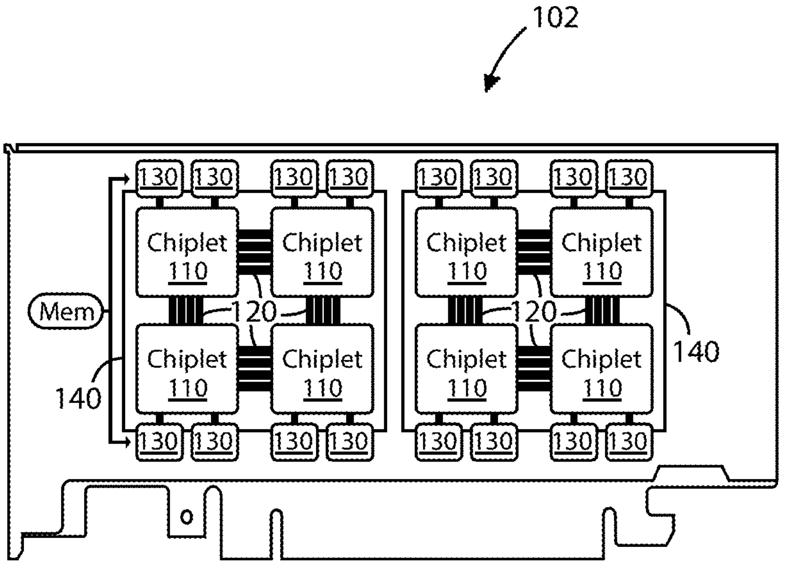

FIG. 1B illustrates a simplified AI accelerator apparatus 102 with eight chiplet devices 110 configured in two groups of four chiplets on the substrate member 140. Here, each chiplet device 110 within a group is coupled to other chiplet devices by one or more D2D interconnects 120. Apparatus 102 also shows a DRAM memory interface 130 coupled to each of the chiplet devices 110. The DRAM memory interface 130 can be coupled to one or more memory modules, represented by the "Mem" block.

As shown, the AI accelerator apparatuses 101 and 102 are embodied in peripheral component interconnect express (PCIe) card form factors, but the AI accelerator apparatus can be configured in other form factors as well. These PCIe card form factors can be configured in a variety of dimensions (e.g., full height, full length (FHFL); half height, half length (HHHL), etc.) and mechanical sizes (e.g., 1×, 2×, 4×, 16×, etc.). In an example, one or more substrate members 140, each having one or more chiplets, are coupled to a PCIe card. Those of ordinary skill in the art will recognize other variations, modifications, and alternatives to these elements and configurations of the AI accelerator apparatus.

Embodiments of the AI accelerator apparatus can implement several techniques to improve performance (e.g., computational efficiency) in various AI applications. The AI accelerator apparatus can include digital in-memory-compute (DIMC) to integrate computational functions and memory fabric. Algorithms for the mapper, numerics, and sparsity can be optimized within the compute fabric. And, use of chiplets and interconnects configured on organic interposers can provide modularity and scalability.

According to an example, the present invention implements chiplets with in-memory-compute (IMC) functionality, which can be used to accelerate the computations required by the workloads of transformers. The computations for training these models can include performing a scaled dot-product attention function to determine a probability distribution associated with a desired result in a particular AI application. In the case of training NLP models, the desired result can include predicting subsequent words, determining contextual word meaning, translating to another language, etc.

The chiplet architecture can include a plurality of slice devices (or slices) controlled by a central processing unit (CPU) to perform the transformer computations in parallel. Each slice is a modular IC device that can process a portion of these computations. The plurality of slices can be divided into tiles/gangs (i.e., subsets) of one or more slices with a CPU coupled to each of the slices within the tile. This tile CPU can be configured to perform transformer computations in parallel via each of the slices within the tile. A global CPU can be coupled to each of these tile CPUs and be configured to perform transformer computations in parallel via all of the slices in one or more chiplets using the tile CPUs. Further details of the chiplets are discussed in reference to FIGS. 2A-5B, while transformers are discussed in reference to FIGS. 6-9.

Figure 2A:
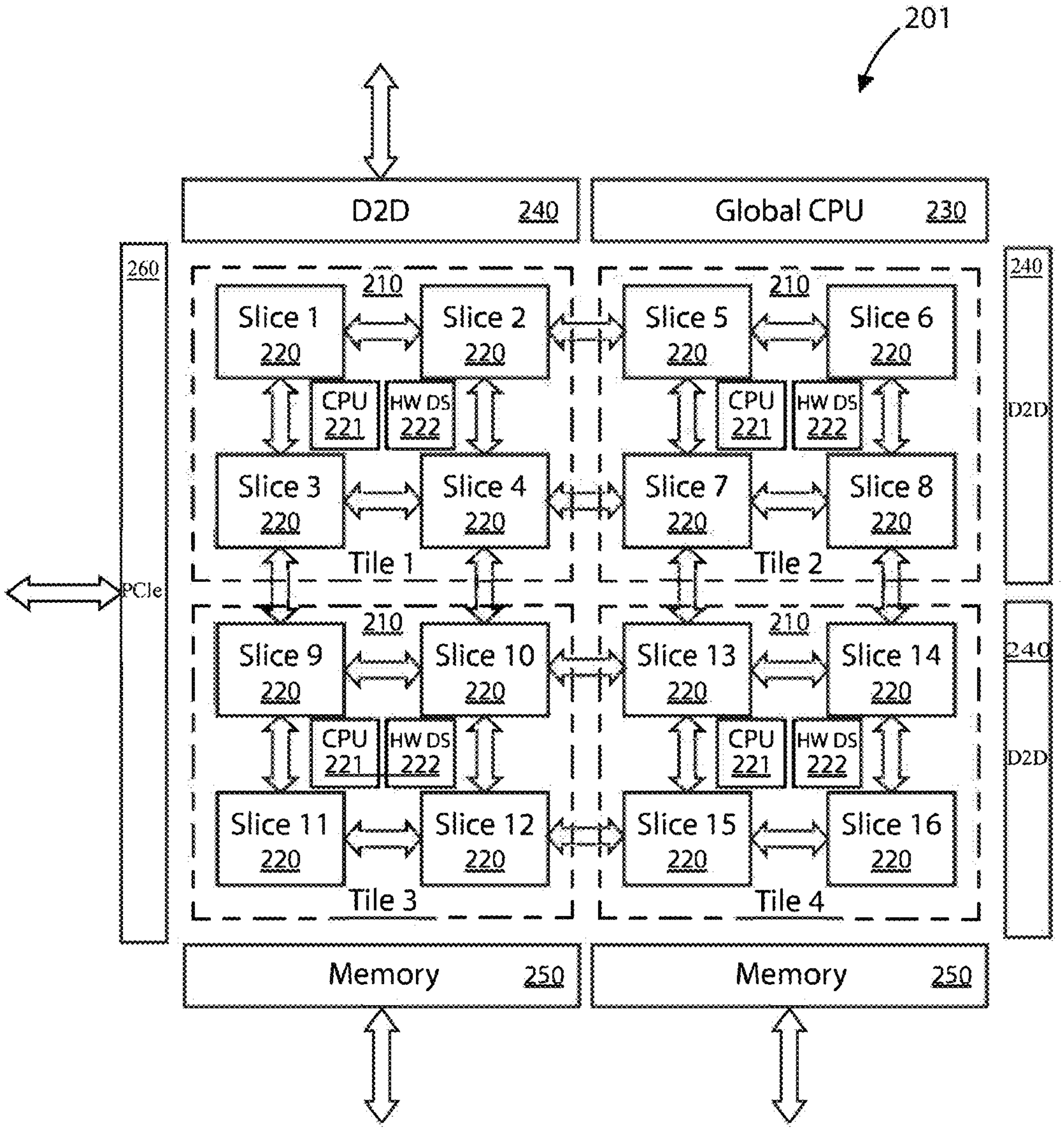
FIGS. 2A-2B are simplified block diagrams illustrating 16-slice chiplet devices according to examples of the present invention.

FIG. 2A is a simplified block diagram illustrating an example configuration of a 16-slice chiplet device 201. In this case, the chiplet 201 includes four tile devices 210, each of which includes four slice devices 220, a CPU 221, and a hardware dispatch (HW DS) device 222. In a specific example, these tiles 210 are arranged in a symmetrical manner. As discussed previously, the CPU 221 of a tile 210 can coordinate the operations performed by all slices within the tile. The HW DS 222 is coupled to the CPU 221 and can be configured to coordinate control of the slices 220 in the tile 210 (e.g., to determine which slice in the tile processes a target portion of transformer computations). In a specific example, the CPU 221 can be a reduced instruction set computer (RISC) CPU, or the like. Further, the CPU 221 can be coupled to a dispatch engine, which is configured to coordinate control of the CPU 221 (e.g., to determine which portions of transformer computations are processed by the particular CPU).

The CPUs 221 of each tile 210 can be coupled to a global CPU via a global CPU interface 230 (e.g., buses, connectors, sockets, etc.). This global CPU can be configured to coordinate the processing of all chiplet devices in an AI accelerator apparatus, such as apparatuses 101 and 102 of FIGS. 1A and 1B, respectively. In an example, a global CPU can use the HW DS 222 of each tile to direct each associated CPU 221 to perform various portions of the transformer computations across the slices in the tile. Also, the global CPU can be a RISC processor, or the like. The chiplet 201 also includes D2D interconnects 240 and a memory interface 250, both of which are coupled to each of the CPUs 221 in each of the tiles. In an example, the D2D interconnects can be configured with single-ended signaling. The memory interface 250 can include one or more memory buses coupled to one or more memory devices (e.g., DRAM, SRAM, SDRAM, or the like).

Further, the chiplet 201 includes a PCIe interface/bus 260 coupled to each of the CPUs 221 in each of the tiles. The PCIe interface 260 can be configured to communicate with a server or other communication system. In the case of a plurality of chiplet devices, a main bus device is coupled to the PCIe bus 260 of each chiplet device using a master chiplet device (e.g., main bus device also coupled to the master chiplet device). This master chiplet device is coupled to each other chiplet device using at least the D2D interconnects 240. The master chiplet device and the main bus device can be configured overlying a substrate member (e.g., same substrate as chiplets or separate substrate). An apparatus integrating one or more chiplets can also be coupled to a power source (e.g., configured on-chip, configured in a system, or coupled externally) and can be configured and operable to a server, network switch, or host system using the main bus device. The server apparatus can also be one of a plurality of server apparatuses configured for a server farm within a data center, or other similar configuration.

In a specific example, an AI accelerator apparatus configured for GPT-3 can incorporate eight chiplets (similar to apparatus 102 of FIG. 1B). The chiplets can be configured with D2D 16×16 Gb/s interconnects, 32-bit LPDDR5 6.4 Gb/s memory modules, and 16 lane PCIe Gen 5 PHY NRZ 32 Gb/s/lane interface. LPDDR5 (16×16 GB) can provide the necessary capacity, bandwidth and low power for large scale NLP models, such as quantized GPT-3. Of course, there can be other variations, modifications, and alternatives.

Figure 2B:
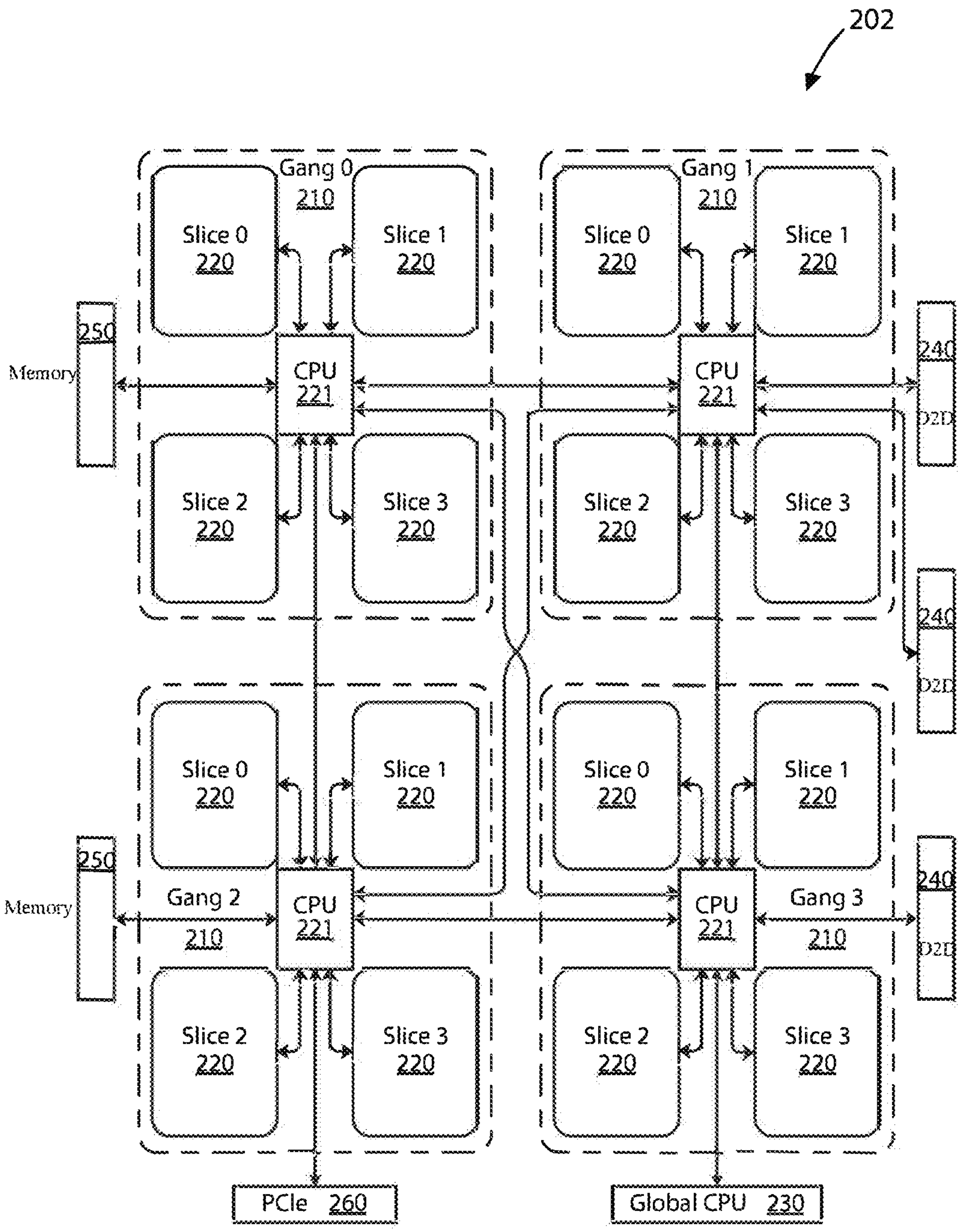

FIG. 2B is a simplified block diagram illustrating an example configuration of a 16-slice chiplet device 202. Similar to chiplet 201, chiplet 202 includes four gangs 210 (or tiles), each of which includes four slice devices 220 and a CPU 221. As shown, the CPU 221 of each gang/tile 210 is coupled to each of the slices 220 and to each other CPU 221 of the other gangs/tiles 210. In an example, the tiles/gangs serve as neural cores, and the slices serve as compute cores. With this multi-core configuration, the chiplet device can be configured to take and run several computations in parallel. The CPUs 221 are also coupled to a global CPU interface 230, D2D interconnects 240, a memory interface 250, and a PCIe interface 260. As described for FIG. 2A, the global CPU interface 230 connects to a global CPU that controls all of the CPUs 221 of each gang 210.

Figure 3A:
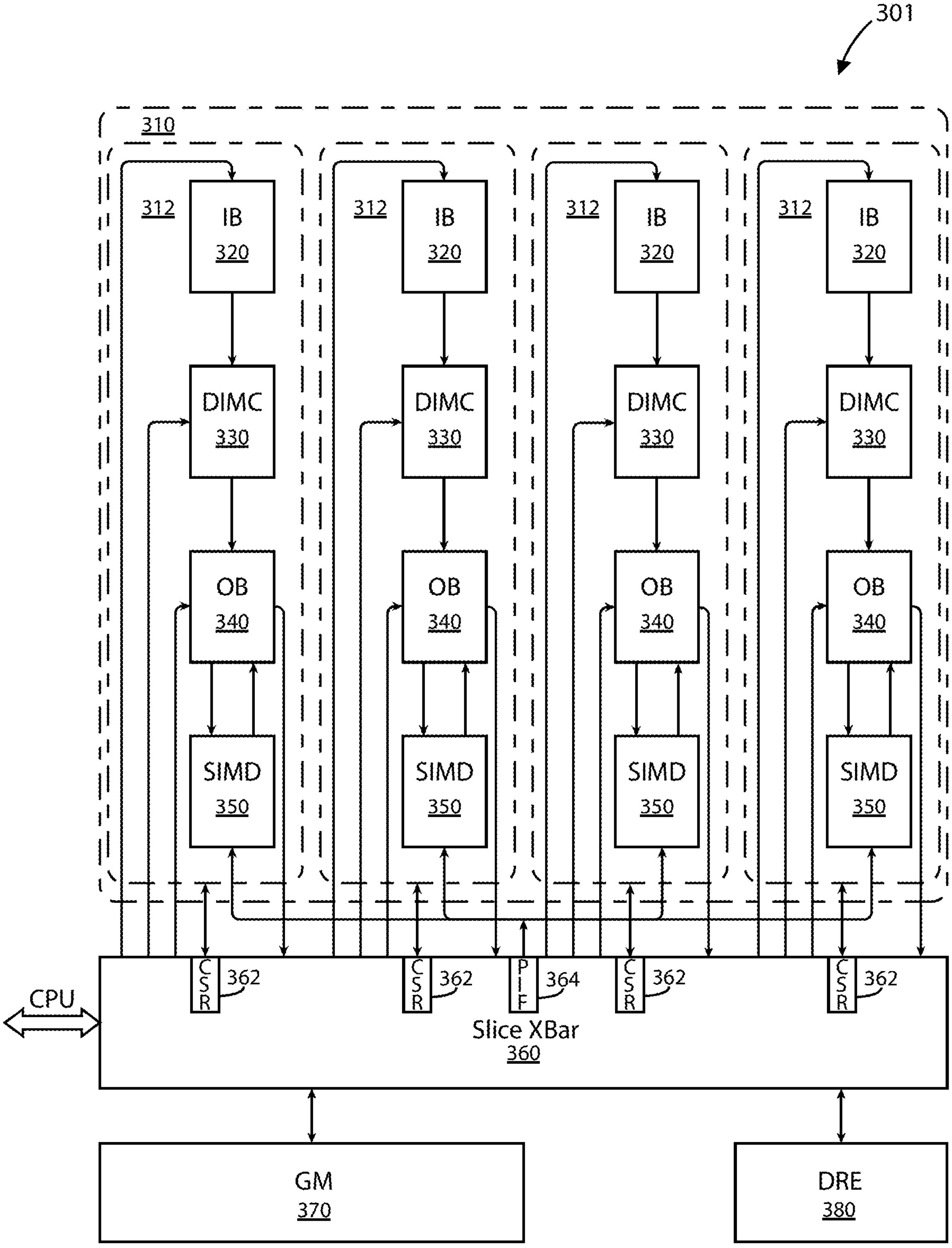
FIGS. 3A-3B are simplified block diagrams illustrating slice devices according to examples of the present invention.

FIG. 3A is a simplified block diagram illustrating an example slice device 301 of a chiplet. For the 16-slice chiplet example, slice device 301 includes a compute core 310 having four compute paths 312, each of which includes an input buffer (IB) device 320, a digital in-memory-compute (DIMC) device 330, an output buffer (OB) device 340, and a Single Instruction, Multiple Data (SIMD) device 350 coupled together. Each of these paths 312 is coupled to a slice cross-bar/controller 360, which is controlled by the tile CPU to coordinate the computations performed by each path 312.

In an example, the DIMC is coupled to a clock and is configured within one or more portions of each of the plurality of slices of the chiplet to allow for high throughput of one or more matrix computations provided in the DIMC such that the high throughput is characterized by 512 multiply accumulates per a clock cycle. In a specific example, the clock coupled to the DIMC is a second clock derived from a first clock (e.g., chiplet clock generator, AI accelerator apparatus clock generator, etc.) configured to output a clock signal of about 0.5 GHz to 4 GHz; the second clock can be configured at an output rate of about one half of the rate of the first clock. The DIMC can also be configured to support a block structured sparsity (e.g., imposing structural constraints on weight patterns of a neural networks like a transformer).

In an example, the SIMD device 350 is a SIMD processor coupled to an output of the DIMC. The SIMD 350 can be configured to process one or more non-linear operations and one or more linear operations on a vector process. The SIMD 350 can be a programmable vector unit or the like. The SIMD 350 can also include one or more random-access memory (RAM) modules, such as a data RAM module, an instruction RAM module, and the like.

In an example, the slice controller 360 is coupled to all blocks of each compute path 312 and also includes a control/status register (CSR) 362 coupled to each compute path. The slice controller 360 is also coupled to a memory bank 370 and a data reshape engine (DRE) 380. The slice controller 360 can be configured to feed data from the memory bank 370 to the blocks in each of the compute paths 312 and to coordinate these compute paths 312 by a processor interface (PIF) 364. In a specific example, the PIF 364 is coupled to the SIMD 350 of each compute path 312.

Figure 3B:
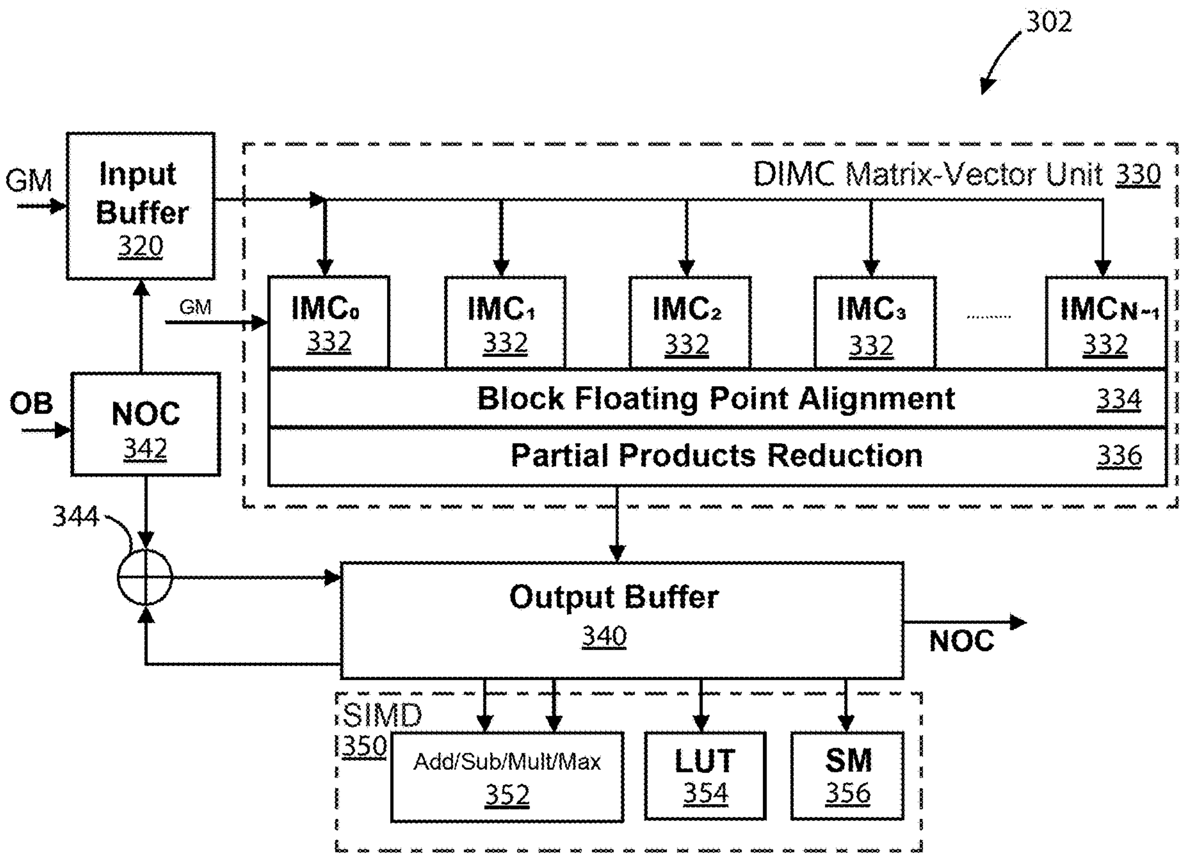

Further details for the compute core 310 are shown in FIG. 3B. The simplified block diagram of slice device 302 includes an input buffer 320, a DIMC matrix vector unit 330, an output buffer 340, a network on chip (NoC) device 342, and a SIMD vector unit 350. The DIMC unit 330 includes a plurality of in-memory-compute (IMC) modules 332 configured to compute a Scaled Dot-Product Attention function on input data to determine a probability distribution, which requires high-throughput matrix multiply-accumulate operations.

These IMC modules 332 can also be coupled to a block floating point alignment module 334 and a partial products reduction module 336 for further processing before outputting the DIMC results to the output buffer 540. In an example, the input buffer 320 receives input data (e.g., data vectors) from the memory bank 370 (shown in FIG. 3A) and sends the data to the IMC modules 332. The IMC modules 332 can also receive instructions from the memory bank 370 as well.

In addition to the details discussed previously, the SIMD 350 can be configured as an element-wise vector unit. The SIMD 350 can includes a computation unit 352 (e.g., add, subtract, multiply, max, etc.), a look-up table (LUT) 354, and a state machine (SM) module 356 configured to receive one or more outputs from the output buffer 340.

The NoC device 342 is coupled to the output buffer 340 configured in a feedforward loop via shortcut connection 344. Also, the NoC device 342 is coupled to each of the slices and is configured for multicast and unicast processes. More particularly, the NoC device 342 can be configured to connect all of the slices and all of the tiles, multi-cast input activations to all of the slices/tiles, and collect the partial computations to be unicast for a specially distributed accumulation.

Considering the previous eight-chiplet AI accelerator apparatus example, the input buffer can have a capacity of 64 KB with 16 banks and the output buffer can have a capacity of 128 KB with 16 banks. The DIMC can be an 8-bit block have dimensions 64×64 (eight 64×64 IMC modules) and the NoC can have a size of 512 bits. The computation block in the SIMD can be configured for 8-bit and 32-bit integer (int) and unsigned integer (uint) computations. These slice components can vary depending on which transformer the AI accelerator apparatus will serve.

Figure 4:
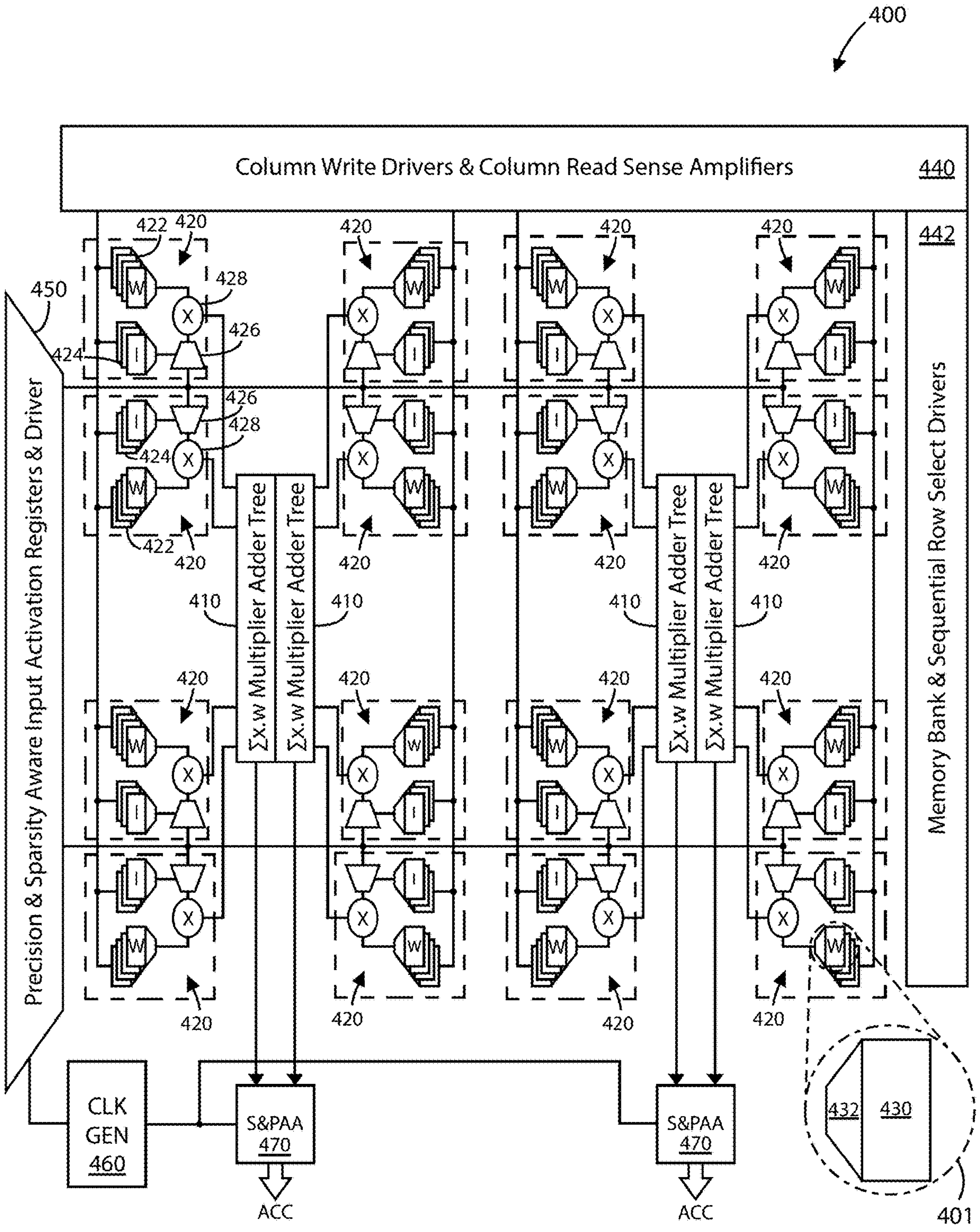
FIG. 4 is a simplified block diagram illustrating an in-memory-compute (IMC) module according to an example of the present invention.

FIG. 4 is a simplified block diagram illustrating an example IMC module 700. As shown, module 700 includes one or more computation tree blocks 410 that are configured to perform desired computations on input data from one or more read-write blocks 420. Each of these read-write blocks 420 includes one or more first memory-select units 422 (also denoted as "W"), one or more second memory-select units 424 (also denoted as "I"), an activation multiplexer 426, and an operator unit 428. The first memory-select unit 422 provides an input to the operator unit 428, while the second memory-select unit 424 controls the activation multiplexer 426 that is also coupled to the operator unit 428. In the case of multiply-accumulate operations, the operator unit 428 is a multiplier unit and the computation tree blocks 410 are multiplier adder tree blocks (i.e., Σx.w).

As shown in close-up 401, each of the memory-select units 422, 424 includes a memory cell 430 (e.g., SRAM cell, or the like) and a select multiplexer 432. Each of the memory-select units 422, 424 is coupled to a read-write controller 440, which is also coupled to a memory bank/driver block 442. In an example, the read-write controller 440 can be configured with column write drivers and column read sense amplifiers, while the memory bank/driver block 432 can configured with sequential row select drivers.

An input activation controller 450 can be coupled to the activation multiplexer 426 each of the read-write blocks 420. The input activation controller 450 can include precision and sparsity aware input activation register and drivers. The operator unit 428 receives the output of the first memory-select unit 422 and receives the output of this block 450 through the activation multiplexer 426, which is controlled by the output of the second memory-select unit 424. The output of the operator unit 428 is then fed into the computation tree block 410.

The input activation block 450 is also coupled to a clock source/generator 460. As discussed previously, the clock generator 460 can produce a second clock derived from a first clock configured to output a clock signal of about 0.5 GHz to 4 GHz; the second clock can be configured at an output rate of about one half of the rate of the first clock. The clock generator 460 is coupled to one or more sign and precision aware accumulators 470, which are configured to receive the output of the computation tree blocks 410. In an example, an accumulator 470 is configured to receive the outputs of two computation tree blocks 410. Example output readings of the IMC are shown in FIGS. 13A-13C.

Referring back to the eight-chiplet AI accelerator apparatus example, the memory cell can be a dual bank 2×6T SRAM cell, and the select multiplexer can be an 8T bank select multiplexer. In this case, the memory bank/driver block 442 includes a dual-bank SRAM bank. Also, the read/write controller can include 64 bytes of write drivers and 64 bytes of read sense amplifiers. Those of ordinary skill in the art will recognize other variations, modifications, and alternatives to these IMC module components and their configurations.

Figure 5A:
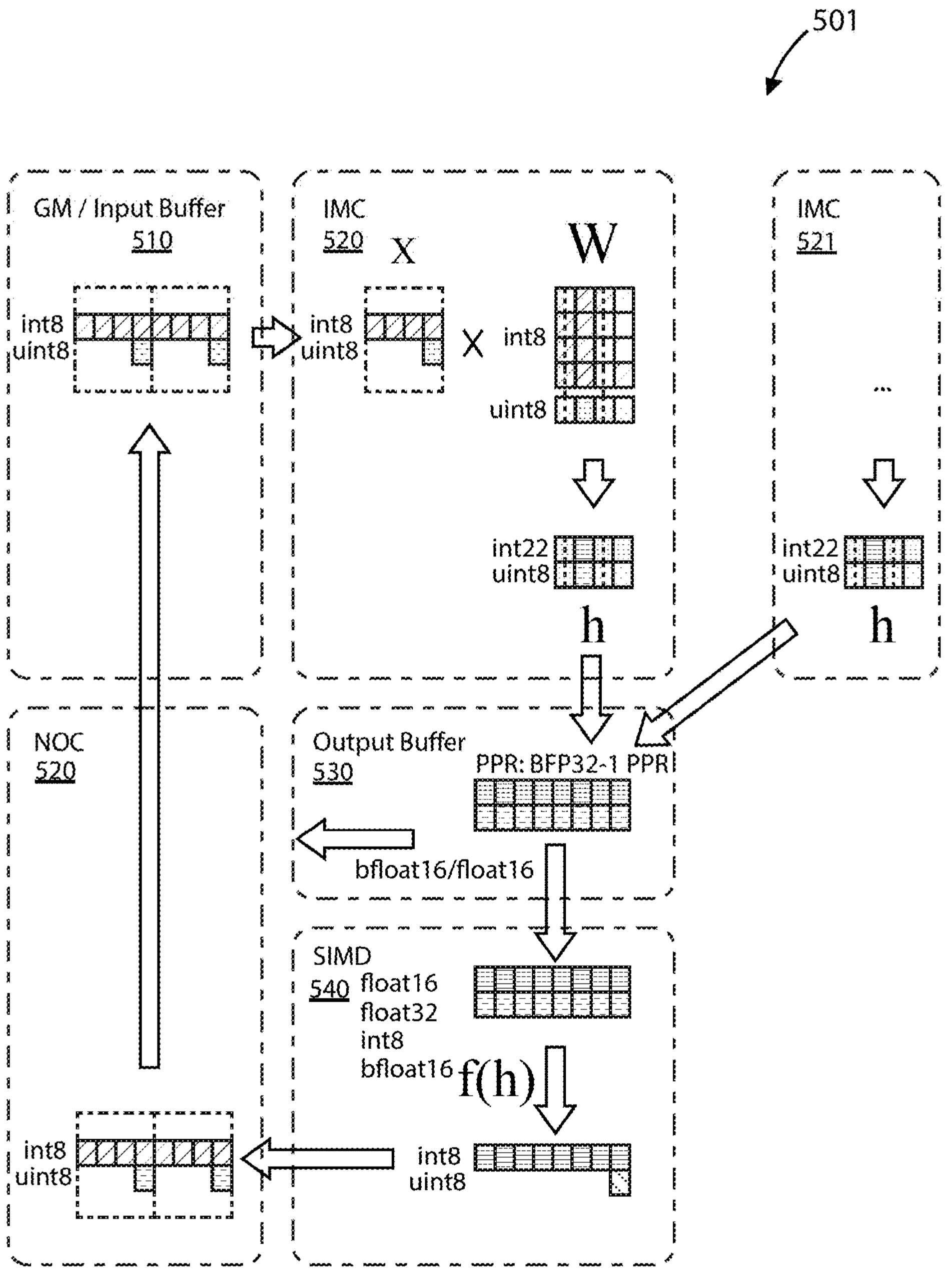
FIG. 5A is a simplified block flow diagram illustrating numerical formats of the data being processed in a slice device according to an example of the present invention.

FIG. 5A is a simplified block flow diagram illustrating example numerical formats of the data being processed in a slice. Diagram 501 shows a loop with the data formats for the GM/input buffer 510, the IMC 520, the output buffer530, the SIMD 540, and the NoC 550, which feeds back to the GM/input buffer 510. The IMC block 520 shows the multiply-accumulate operation (Σx.w). Additionally, the format for the data from IMC 532 flows to the output buffer 530 as well. In this example, the numerical formats include integer (int), floating point (float), and block floating (bfloat) of varying lengths.

Figure 5B:
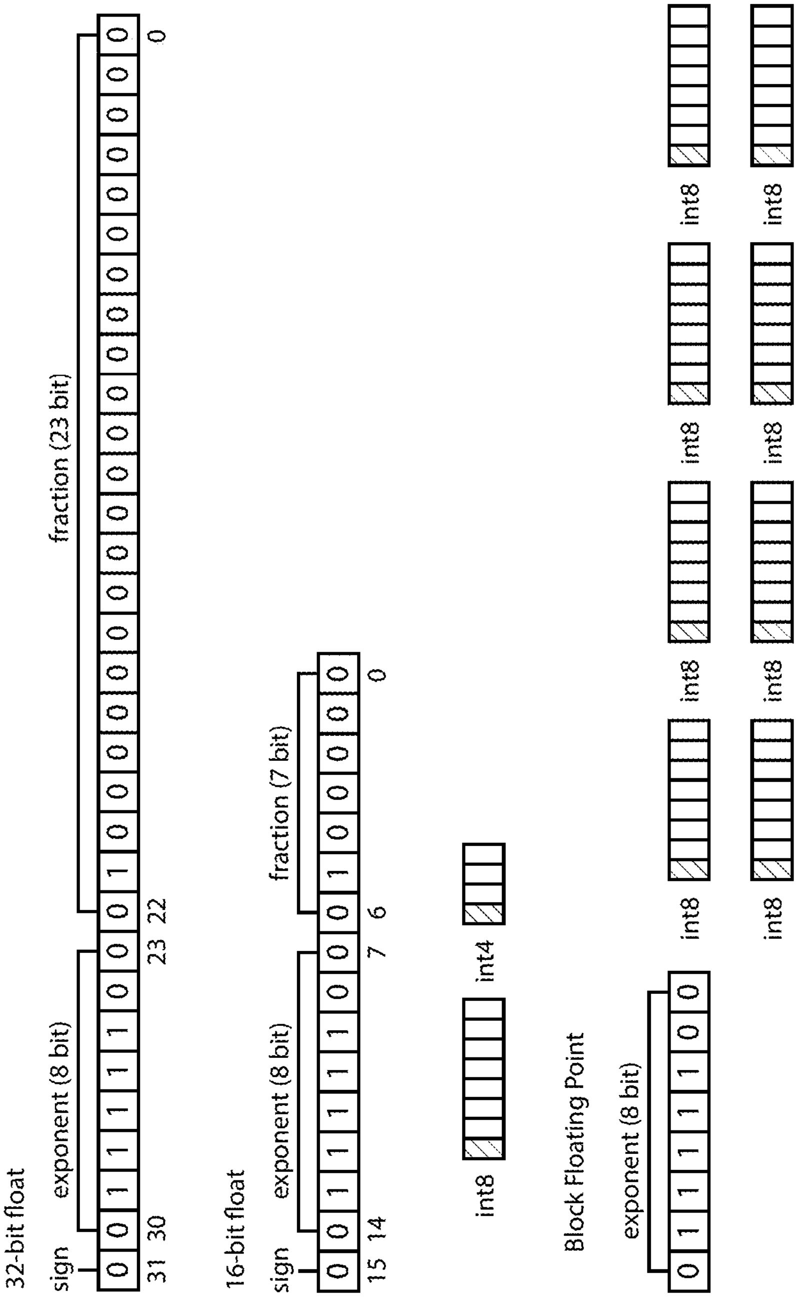
FIG. 5B is a simplified diagram illustrating example numerical formats.

FIG. 5B is a simplified diagram illustrating certain numerical formats, including certain formats shown in FIG. 5A. Block floating point numerics can be used to address certain barriers to performance. Training of transformers is generally done in floating point, i.e., 32-bit float or 16-bit float, and inference is generally done in 8-bit integer ("int8"). With block floating point, an exponent is shared across a set of mantissa significant values (see diagonally line filled blocks of the int8 vectors at the bottom of FIG. 5B), as opposed to floating point where each mantissa has a separate exponent (see 32-bit float and 16-bit float formats at the top of FIG. 5A). The method of using block floating point numerical formats for training can exhibit the efficiency of fixed point without the problems of integer arithmetic, and can also allow for use of a smaller mantissa, e.g., 4-bit integer ("int4") while retaining accuracy. Further, by using the block floating point format (e.g., for activation, weights, etc.) and sparsity, the inference of the training models can be accelerated for better performance. Those of ordinary skill in the art will recognize other variations, modifications, and alternatives to these numerical formats used to process transformer workloads.

Figure 6:
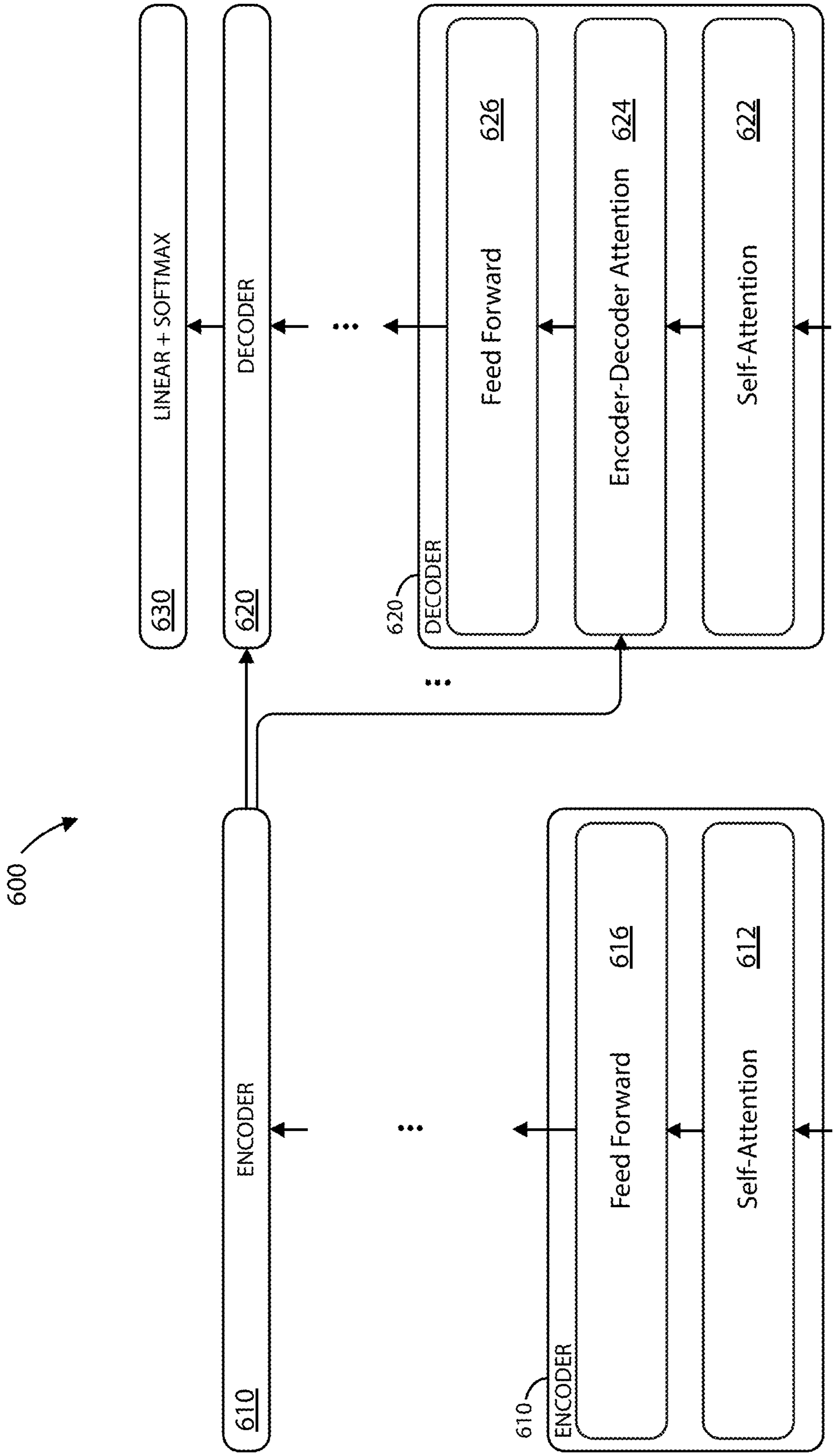
FIG. 6 is a simplified block diagram of a transformer architecture.

FIG. 6 illustrates a simplified transformer architecture 600. The typical transformer can be described as having an encoder stack configured with a decoder stack, and each such stack can have one or more layers. Within the encoder layers 610, a self-attention layer 612 determines contextual information while encoding input data and feeds the encoded data to a feed-forward neural network 616. The encoder layers 610 process an input sequence from bottom to top, transforming the output into a set of attention vectors K and V. The decoder layers 620 also include a corresponding self-attention layer 622 and feed-forward neural network 626, and can further include an encoder-decoder attention layer 624 uses the attention vectors from the encoder stack that aid the decoder in further contextual processing. The decoder stack outputs a vector of floating points (as discussed for FIG. 5B), which is fed to linear and softmax layers 630 to project the output into a final desired result (e.g., desired word prediction, interpretation, or translation). The linear layer is a fully-connected neural network that projects the decoder output vector into a larger vector (i.e., logits vector) that contains scores associated with all potential results (e.g., all potential words), and the softmax layer turns these scores into probabilities. Based on the this probability output, the projected word meaning may be chosen based on the highest probability or by other derived criteria depending on the application.

Transformer model variations include those based on just the decoder stack (e.g., transformer language models such as GPT-2, GPT-3, etc.) and those based on just the encoder stack (e.g., masked language models such as BERT, BERT Large, etc.). Transformers are based on four parameters: sequence length (S) (i.e., number of tokens), number of attention heads (A), number of layers (L), and embedding length (H). Variations of these parameters are used to build practically all transformer-based models today. Embodiments of the present invention can be configured for any similar model types.

A transformer starts as untrained and is pre-trained by exposure to a desired data set for a desired learning application. Transformer-based language models are exposed to large volumes of text (e.g., Wikipedia) to train language processing functions such as predicting the next word in a text sequence, translating the text to another language, etc. This training process involves converting the text (e.g., words or parts of words) into token IDs, evaluating the context of the tokens by a self-attention layer, and predicting the result by a feed forward neural network.

Figure 7:
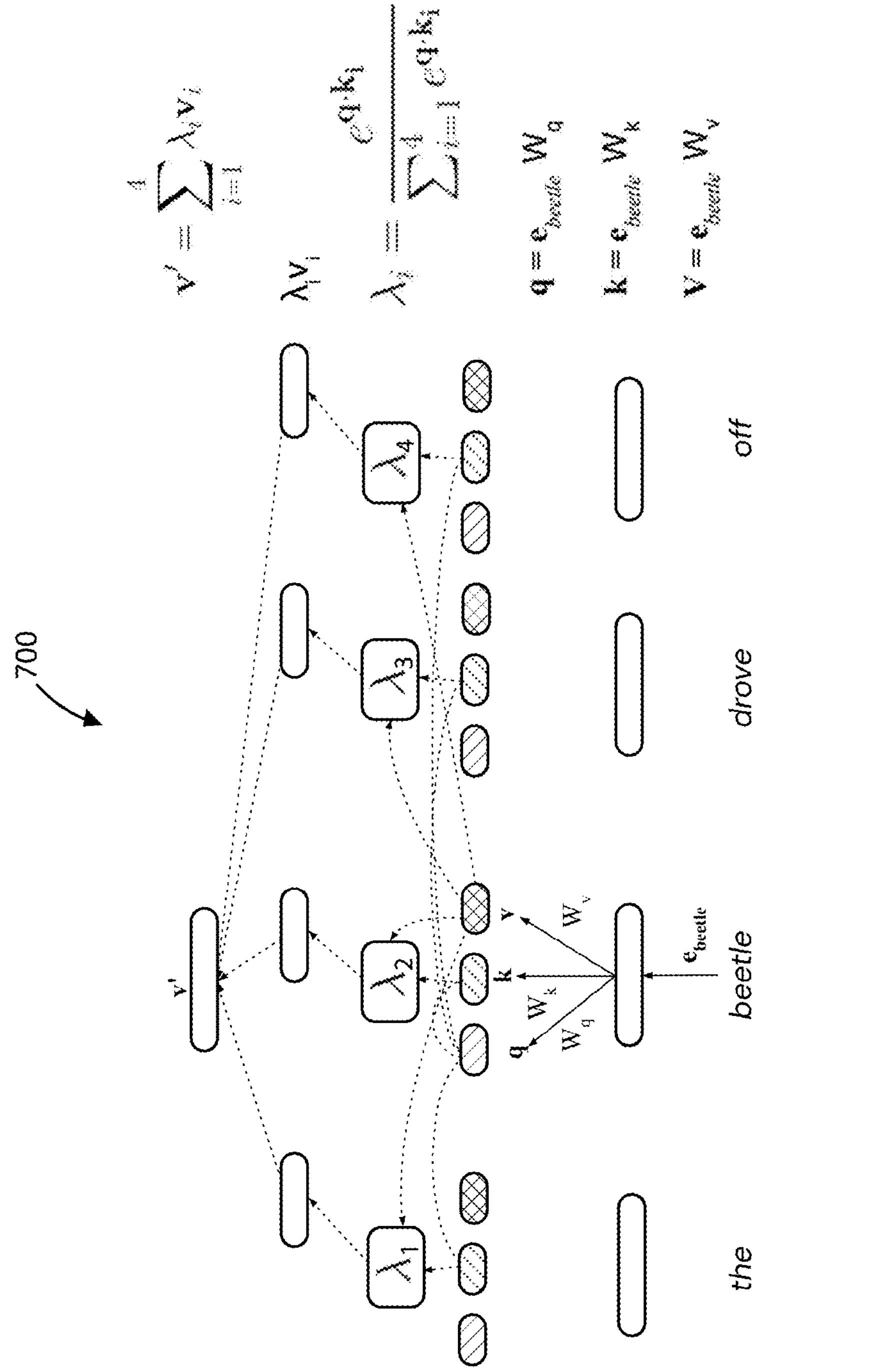
FIG. 7 is a simplified diagram illustrating a self-attention layer process for an example NLP model.

The self-attention process includes (1) determining query (Q), key (K), and value (V) vectors for the embedding of each word in an input sentence, (2) calculating a score for from the dot product of Q and K for each word of the input sentence against a target word, (3) dividing the scores by the square root of the dimension of K, (4) passing the result through a softmax operation to normalize the scores, (5) multiplying each V by the softmax score, and (6) summing up the weighted V vectors to produce the output. An example self-attention process 700 is shown in FIG. 7.

As shown, process 700 shows the evaluation of the sentence "the beetle drove off" at the bottom to determine the meaning of the word "beetle" (e.g., insect or automobile). The first step is to determine the $q_{beetle}$, $k_{beetle}$, and $v_{beetle}$ vectors for the embedding vector $e_{beetle}$. This is done by multiplying $e_{beetle}$ by three different pre-trained weight matrices $W_q$, $W_k$, and $W_v$. The second step is to calculate the dot products of $q_{beetle}$ with the K vector of each word in the sentence (i.e., $k_{the}$, $k_{beetle}$, $k_{drove}$, and $k_{off}$), shown by the arrows between $q_{beetle}$ and each K vector. The third step is to divide the scores by the square root of the dimension $d_k$, and the fourth step is to normalize the scores using a softmax function, resulting in $\lambda_i$. The fifth step is to multiply the V vectors by the softmax score ($\lambda_i v_i$) in preparation for the final step of summing up all the weight value vectors, shown by v' at the top.

Process 700 only shows the self-attention process for the word "beetle", but the self-attention process can be performed for each word in the sentence in parallel. The same steps apply for word prediction, interpretation, translation, and other inference tasks. Further details of the self-attention process in the BERT Large model are shown in FIGS. 8 and 9.

Figure 8:
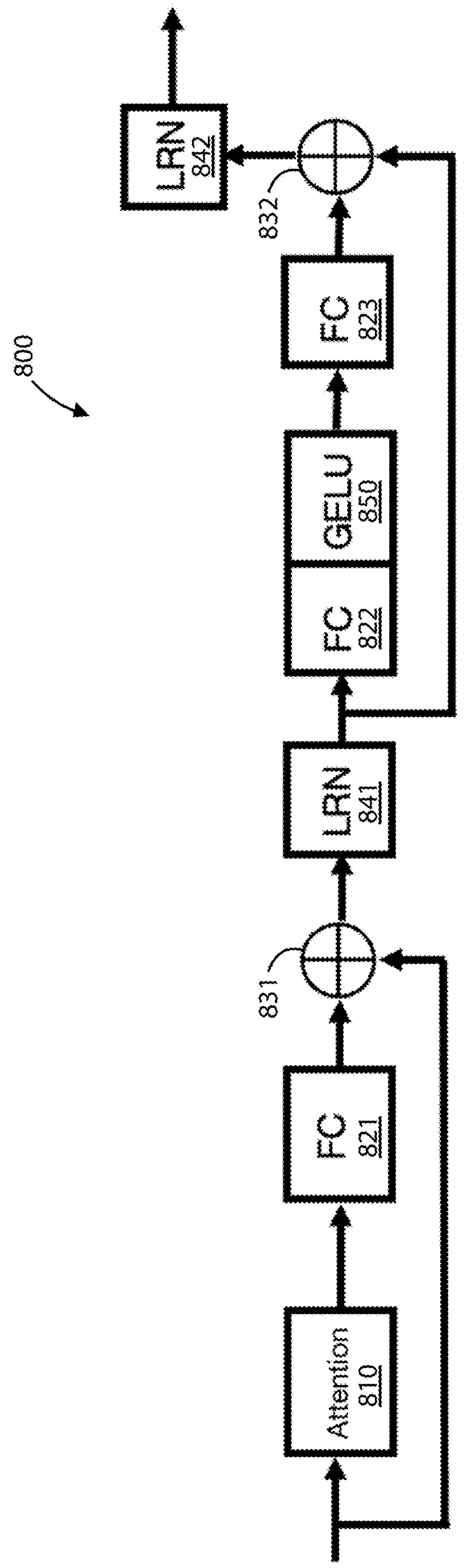
FIG. 8 is a simplified block diagram illustrating an example transformer.

A simplified block diagram of the BERT Large model (S=384, A=16, L=34, and H=1024) is shown in FIG. 8. This figure illustrates a single layer 800 of a BERT Large transformer, which includes an attention head device 810 configured with three different fully-connected (FC) matrices 821-823. As discussed previously, the attention head 810 receives embedding inputs (384×1024 for BERT Large) and measures the probability distribution to come up with a numerical value based on the context of the surrounding words. This is done by computing different combination of softmax around a particular input value and producing a value matrix output having the attention scores.

Figure 9:
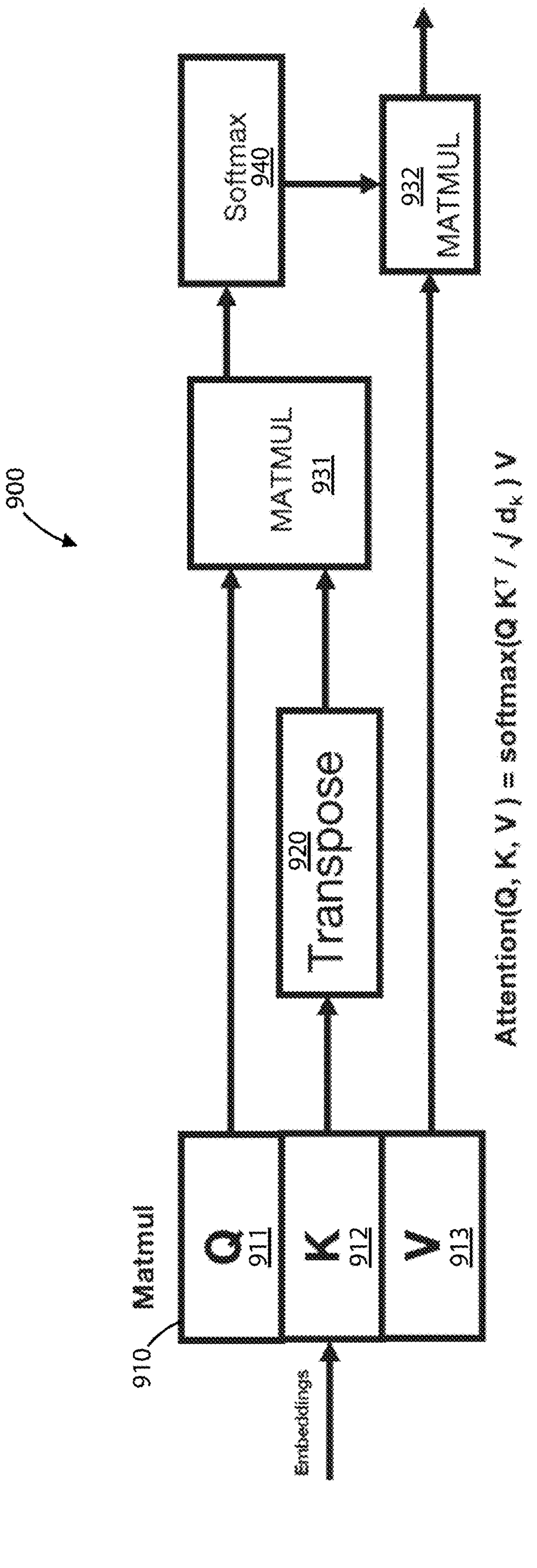
FIG. 9 is a simplified block diagram illustrating an attention head layer of an example transformer.

Further details of the attention head 810 are provided in FIG. 9. As shown, the attention head 900 computes a score according to an attention head function: Attention(Q, K, V)=softmax($QK^T/Nd_k$)V. This function takes queries (Q), keys (K) of dimension $d_k$, and values (V) of dimension $d_k$ and computes the dot products of the query with all of the keys, divides the result by a scaling factor $\sqrt{d_k}$ and applies a softmax function to obtain the weights (i.e., probability distribution) on the values, as shown previously in FIG. 7.

The function is implemented by several matrix multipliers and function blocks. An input matrix multiplier 910 obtains the Q, K, and V vectors from the embeddings. The transpose function block 920 computes $K^T$, and a first matrix multiplier 931 computes the scaled dot product $QK^T/\sqrt{d_k}$. The softmax block 940 performs the softmax function on the output from the first matrix multiplier 931, and a second matrix multiplier 932 computes the dot product of the softmax result and V.

For BERT Large, 16 such independent attention heads run in parallel on 16 AI slices. These independent results are concatenated and projected once again to determine the final values. The multi-head attention approach can be used by transformers for (1) "encoder-decoder attention" layers that allow every position in the decoder to attend over all positions of the input sequence, (2) self-attention layers that allows each position in the encoder to attend to all positions in the previous encoder layer, and (3) self-attention layers that allow each position in the decoder to attend to all positions in the decoder up to and including that position. Of course, there can be variations, modifications, and alternatives in other transformer.

Returning to FIG. 8, the attention score output then goes to a first FC matrix layer 821, which is configured to process the outputs of all of the attention heads. The first FC matrix output goes to a first local response normalization (LRN) block 841 through a short-cut connection 830 that also receives the embedding inputs. The first LRN block output goes to a second FC matrix 822 and a third FC matrix 823 with a Gaussian Error Linear Unit (GELU) activation block 850 configured in between. The third FC matrix output goes to a second LRN block 842 through a second short-cut connection 832, which also receives the output of the first LRN block 841.

Using a transformer like BERT Large, NLP requires very high compute (e.g., five orders of magnitude higher than CV). For example, BERT Large requires 5.6 giga-multiply-accumulate operations per second ("GMACs") per transformer layer. Thus, the NLP inference challenge is to deliver this performance at the lowest energy consumption.

Although the present invention is discussed in the context of a BERT Large transformer for NLP applications, those of ordinary skill in the art will recognize variations, modifications, and alternatives. The particular embodiments shown can also be adapted to other transformer-based models and other AI/machine learning applications.

Many things impact the performance of such transformer architectures. The softmax function tends to be the critical path of the transformer layers (and has been difficult to accelerate in hardware). Requirements for overlapping the compute, SIMD operations and NoC transfers also impacts performance. Further, efficiency of NoC, SIMD, and memory bandwidth utilization is important as well.

Different techniques can be applied in conjunction with the AI accelerator apparatus and chiplet device examples to improve performance, such as quantization, sparsity, knowledge distillation, efficient tokenization, and software optimizations. Supporting variable sequence length (i.e., not requiring padding to the highest sequence lengths) can also reduce memory requirements. Other techniques can include optimizations of how to split self-attention among slices and chips, moving layers and tensors between the slices and chips, and data movement between layers and FC matrices.

According to an example, the present invention provides for an AI accelerator apparatus (such as shown in FIGS. 1A and 1B) coupled to an aggregate of transformer devices (e.g., BERT, BERT Large, GPT-2, GPT-3, or the like). In a specific example, this aggregate of transformer devices can include a plurality of transformers configured in a stack ranging from three to N layers, where N is an integer up to 128.

In an example, each of the transformers is configured within one or more DIMCs such that each of the transformers comprises a plurality of matrix multipliers including QKV matrices configured for an attention layer of a transformer followed by three fully-connected matrices (FC). In this configuration, the DIMC is configured to accelerate the transformer and further comprises a dot product of Q $K^T$ followed by a softmax (Q $K^T$/square root ($d_k$))V. In an example, the AI accelerator apparatus is also includes a SIMD device (as shown in FIGS. 3A and 3B) configured to accelerate a computing process of the softmax function.

According to an example, the present invention provides for methods of compiling the data representations related to transformer-based models mapping them to an AI accelerator apparatus in a spatial array. These methods can use the previously discussed numerical formats as well as sparsity patterns. Using a compile algorithm, the data can be configured to a dependency graph, which the global CPU can use to map the data to the tiles and slices of the chiplets. Example mapping methods are shown in FIGS. 10-13B.

Figure 10:
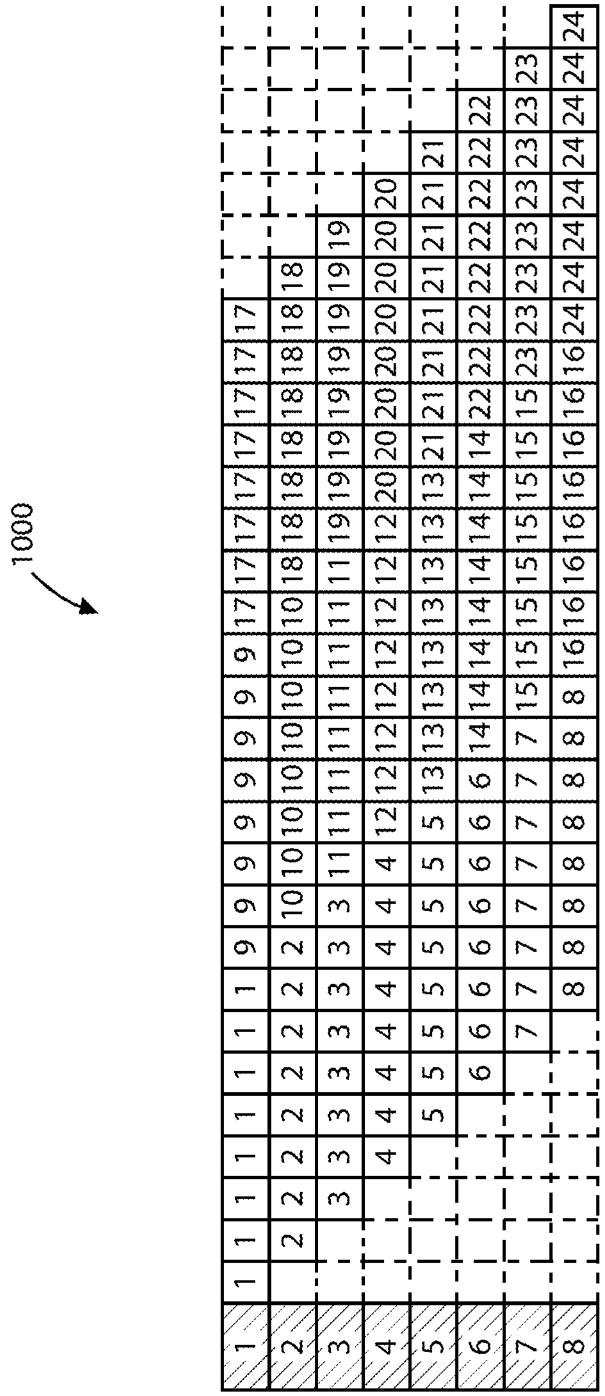
FIG. 10 is a simplified table representing an example mapping process between a 24-layer transformer and an example eight-chiplet AI accelerator apparatus according to an example of the present invention.

FIG. 10 is a simplified table representing an example mapping process between a 24-layer transformer and an example eight-chiplet AI accelerator apparatus. As shown, the chiplets are denoted by the row numbers on the left end and the model layers mapped over time are denoted by the table entry numbers. In this case, the 24 layers of the transformer (e.g., BERT Large) are mapped to the chiplets sequentially in a staggered manner (i.e., first layer mapped onto the first chiplet, the second layer mapped onto the second chiplet one cycle after the first, the third layer mapped onto the third chiplet two cycles after the first, etc.) After eight cycles, the mapping process loops back to the first chiplet to start mapping the next eight model layers.

Figure 11:
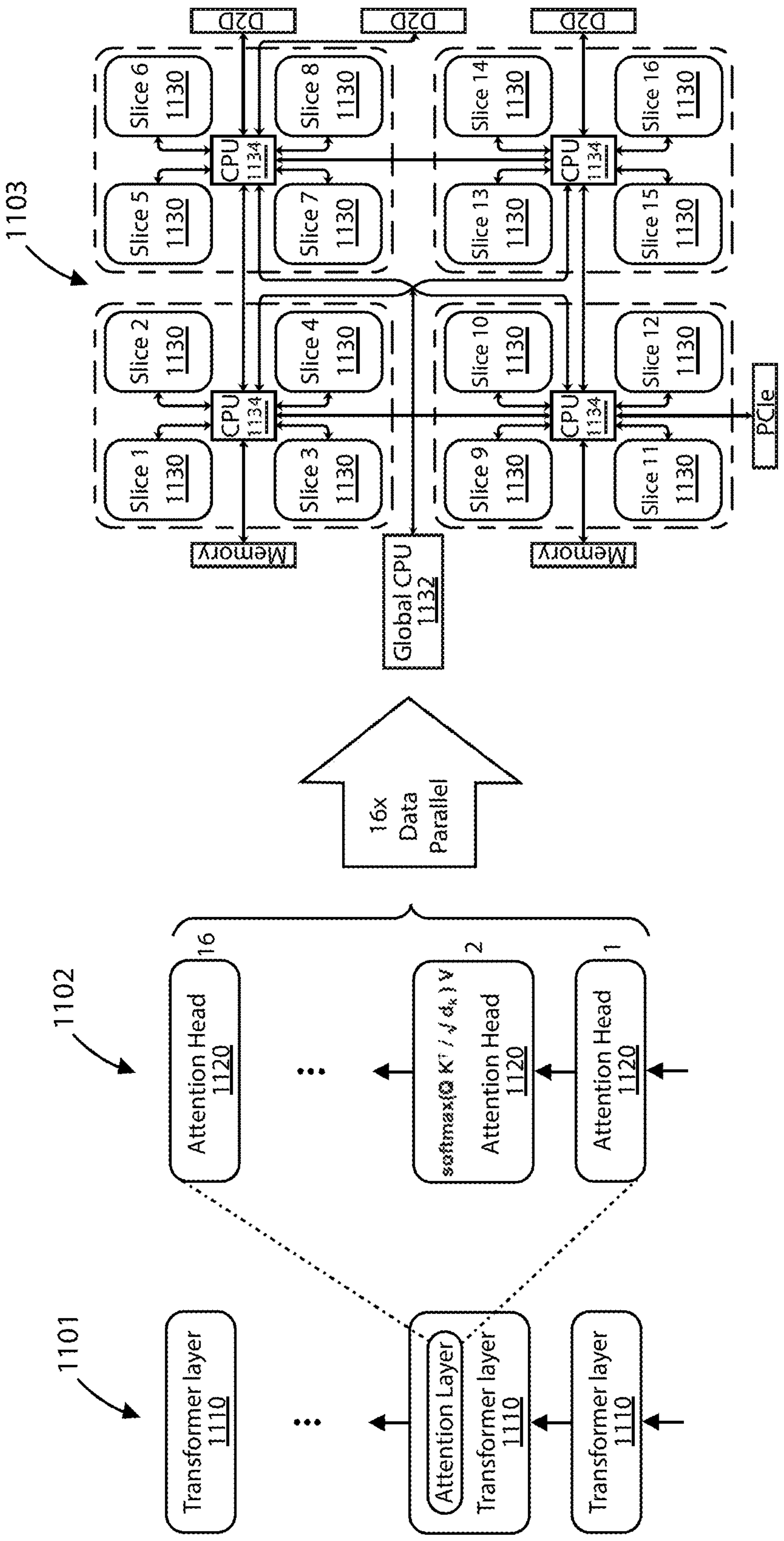
FIG. 11 is a simplified block flow diagram illustrating a mapping process between a transformer and an AI accelerator apparatus according to an example of the present invention.

FIG. 11 is a simplified block flow diagram illustrating a mapping process between a transformer and an example AI accelerator apparatus. As shown, a transformer 1101 includes a plurality of transformer layers 1110, each having an attention layer 1102. In this case, there are 16 attention heads 1110 (e.g., BERT Large) computing the attention function as discussed previously. These 16 attention heads are mapped to 16 slices 1130 of an AI accelerator apparatus 1103 (similar to apparatuses 201 and 202) via global CPU 1132 communicating to the slice CPUs 1134.

Figure 12:
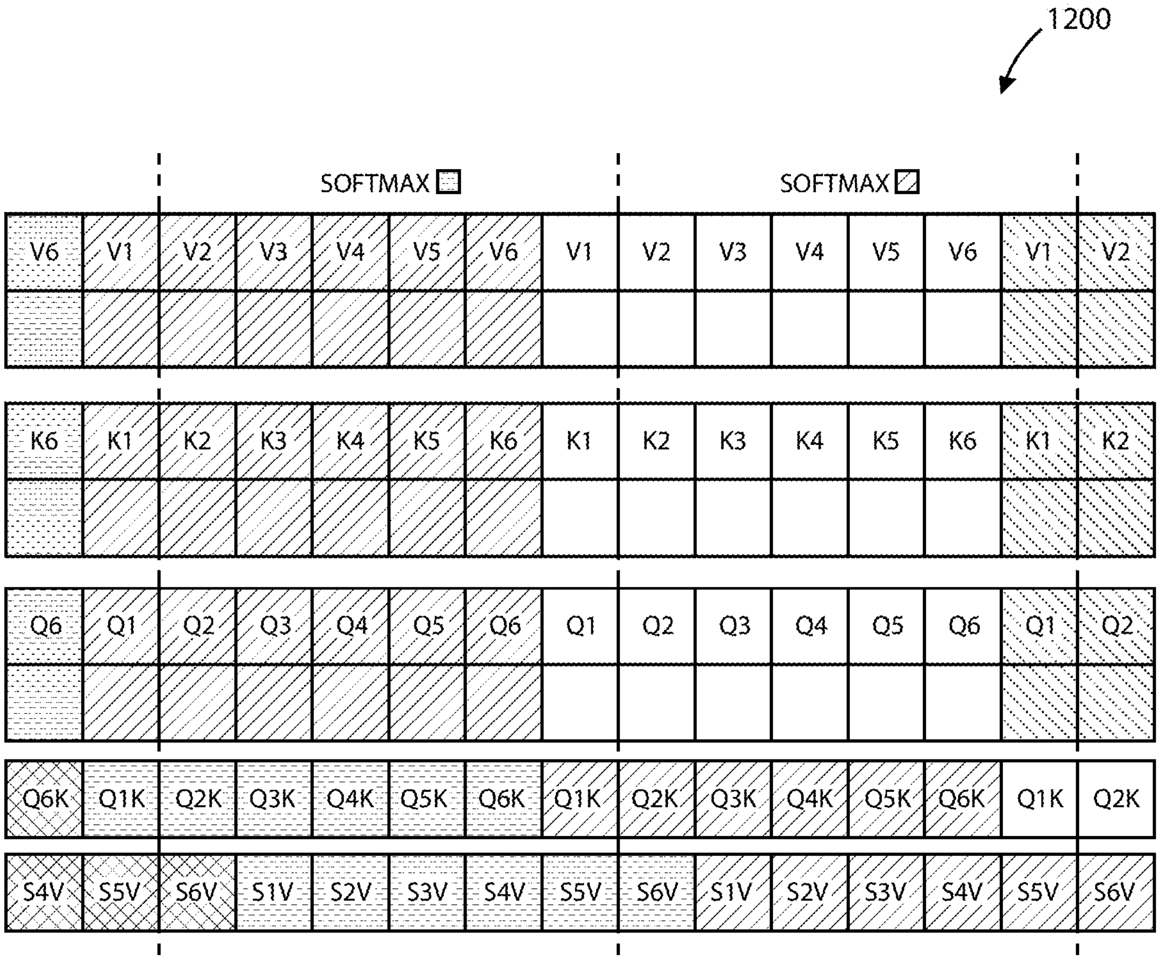
FIG. 12 is a simplified table representing a tiling attention process of a transformer to an AI accelerator apparatus according to an example of the present invention.

FIG. 12 is a simplified table representing an example tiling attention process between a transformer and an example AI accelerator apparatus. Table 1200 shows positions of Q, K, and V vectors and the timing of the softmax performed on these vectors. The different instances of the softmax are distinguished by fill pattern (e.g., diagonal line filled blocks representing Q, K, V vectors and diagonal line filled blocks representing Q-K and Softmax-V dot products).

In an example, the embedding E is a [64L, 1024] matrix (L=6 for sentence length of 384), and $E_1$ is a [64, 1024] submatrix of E, which is determined as $E_i = E_{(64i-63):(64i),\ 1:1024}$, where i=1 . . . L. Each of the K and Q matrices can be allocated to two slices (e.g., @[SL1:AC3,4]: $K_i \leftarrow E_i \times K_{1\ ...\ 1024,\ 1\ ...\ 64}$; and @[SL1:AC1,2]:

$Q_i \leftarrow E_i \times Q_{1 \ldots 1024, 1 \ldots 64}$). An example data flows through IMC and SIMD modules are shown in the simplified tables of FIGS. 13A-13C.

FIG. 13A shows table 1301 representing mapping self-attention to an AI slice according to an example of the present invention. The left side shows the IMC cycles for matrix multiplications performed by IMC modules AC1-AC4, while the right side shows SIMD cycles for element-wise computations performed by SIMD modules SIMD1-SIMD4. In this example, the IMC modules determine the key vectors K1-K6 (a[64×512]; w[512×64]; o[64×64]), and query vectors Q1-Q6 (a[64×512]; w[512×64]; o[64×64]), followed by the transpose QKT1-QKT6 (a[64×64]; w[64×384]; o[64×384]). Then, the SIMD modules compute the softmax Smax1-Smax6 (a[64×384]). Meanwhile, the IMC modules determine the value vectors V1-V6 (a[64×512]; w[512×64]; o[64×64]), followed by the multiplication of the value vectors and the softmax results.

FIG. 13B shows table 1302 representing mapping dense embedding vectors and the second FC matrix to an AI slice (left: IMCs; right: SIMDs) according to an example of the present invention. In this example, the IMCs process the embedding vectors E1-E6 (a[64×512]; w[512×64]; o[64×64]), which corresponds to the path from the attention head 810 to the second FC matrix 822 in FIG. 8. Following the processing of each embedding vector E, the SIMDs process the GELU (a[64×64]), which corresponds to the path through the first LRN block 841 and the GELU block 850 in FIG. 8.

FIG. 13C shows table 1303 representing mapping the third FC matrix to an AI slice (left: IMCs; right: SIMDs) according to an example of the present invention. In this example, the IMCs process the results through the second FC matrix, which corresponds to the path through the third FC matrix 823 and the second LRN block 842 in FIG. 8. Those of ordinary skill in the art will recognize other variations, modifications, and alternatives to the mappings shown in FIGS. 10-13C.

Figure 14:
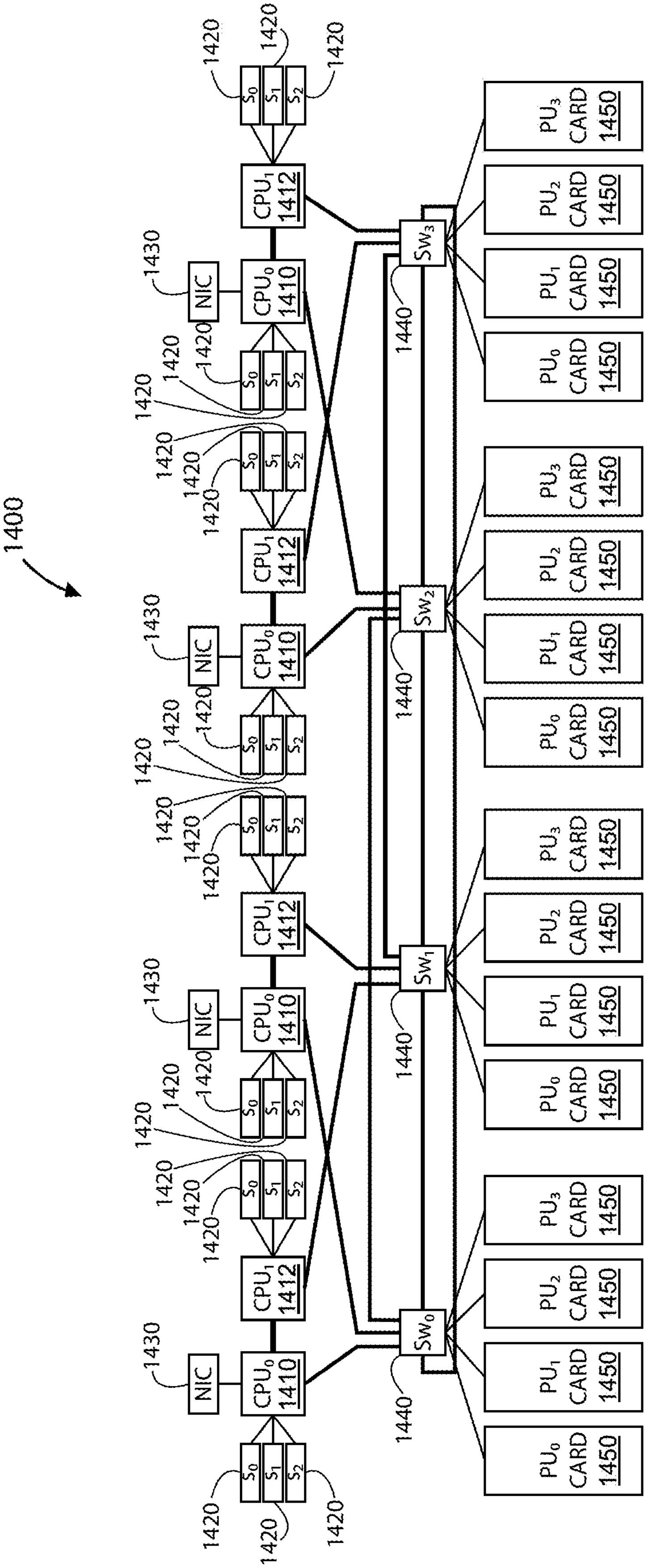
FIG. 14 is a simplified block diagram illustrating a server system according to an example of the present invention.

FIG. 14 is a simplified block diagram illustrating a server system according to an example of the present invention. As shown, the server system 1400 includes a plurality of processors devices 1410, and each processor device 1410 is coupled to one or more memory devices 1420 and a network interface controller (NIC) device 1430. In an example, the memory devices 1420 can include hard disk drives (HDDs) or solid state drives (SSDs), such as an E1.S SSD, or the like. Here, each processor device 1410 is coupled to three memory devices 1420 (denoted as $S_0$-$S_2$). Each processor device 1410 can also be coupled to one or more processor devices in a multiprocessor configuration. In a specific example, the processors in the multiprocessor configuration can be coupled using point-to-point processor interconnects, such as Ultra Path Interconnect (UPI) or the like. In FIG. 14, the system 1400 includes four multiprocessors, each having the first processor device 1410 coupled to a second processor device 1412.

The system 1400 also includes a plurality of switch devices 1440 coupled to the processor devices 1410, 1412. These switch devices 1440 can be configured for various form factors, such as peripheral component interconnect express (PCIe), or the like. Each switch device 1440 is coupled to each other switch device (e.g., using PCIe cables, or the like). In a specific example, certain connections between switches 1440 can be configured or pipeline traffic or host traffic. In FIG. 14, the system 1400 includes four switch devices 1440 (denoted as $Sw_0$-$Sw_3$) coupled to the processor devices 1410, 1412 such that the second processor device 1412 is coupled to a different switch device 1440 from the first processor device 1410.

Here, the first processor device 1410 of the first multiprocessor is coupled to the first switch device 1440, while the second processor device 1412 of the first multiprocessor is coupled to the second switch device 1440. Similarly, the first processor device 1410 of the second multiprocessor is coupled to the first switch device 1440, while the second processor device 1412 of the second multiprocessor is coupled to the second switch device 1440. The third and fourth multiprocessors have a similar configuration, except with the third and fourth switch devices 1440. Although system 1400 shows this pair coupling configuration between the first and second processor devices 1410, 1412 and the switch devices 1440, the coupling configurations can be scaled to larger subsets of switch devices 1440 with multiprocessors have additional processor devices.

Each switch device 1440 is also coupled to one or more processing unit (PU) devices 1450, which include can GPUs configurations, TPUs configurations, or the like. These PU devices 1450 can include the previously discussed AI accelerator apparatus configurations, which can include various form factors such as PCIe, or the like. In the PCIe card configuration, these PU devices 1450 can be configured similarly to the AI accelerator apparatuses 101 and 102 of FIGS. 1A and 1B. In FIG. 14, the system 1400 includes four PU devices (denoted as $PU_0$-$PU_3$). Those of ordinary skill in the art will recognize other variations, modifications, and alternatives to this server system configuration.

Figure 15:
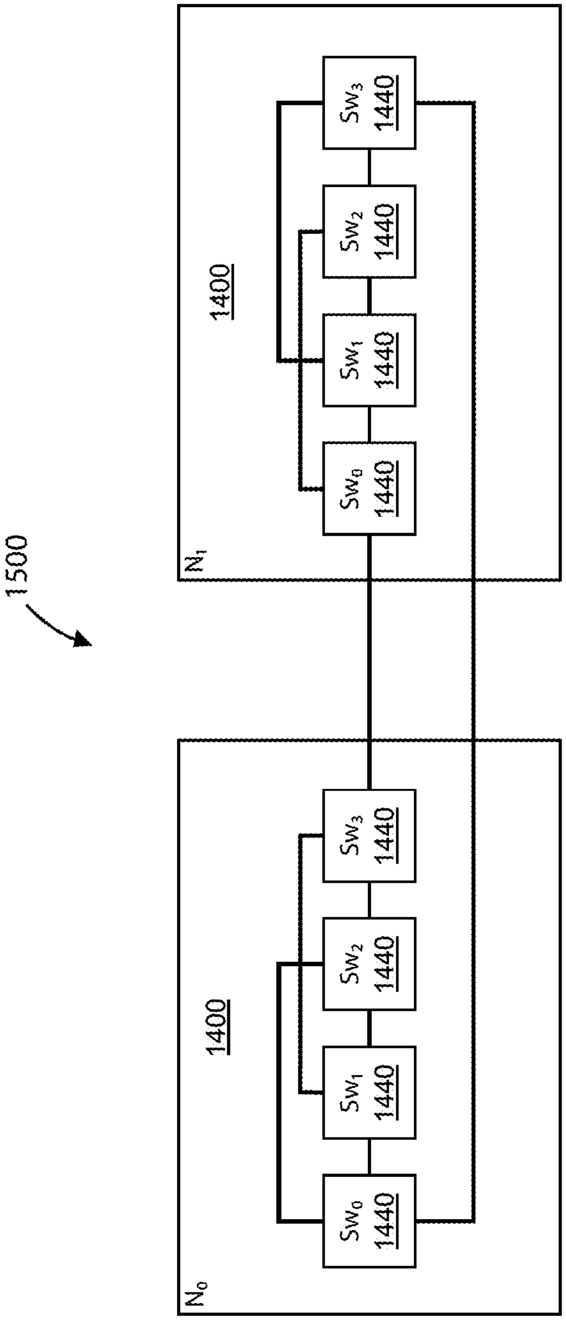
FIG. 15 is a simplified block diagram illustrating a multi-node server system according to an example of the present invention.

FIG. 15 is a simplified block diagram illustrating a multi-node server system according to an example of the present invention. As shown, the multi-node server system 1500 includes at least two server systems 1400 (see FIG. 14) configured as server nodes that are coupled together. Only the switch devices 1440 (denoted as $Sw_0$-$Sw_3$) are shown within each server system 1400 to highlight the example connections between the switch devices both within the node and between the two nodes. Here, the first switch device 1440 of the first node is coupled to the fourth switch device 1440 of the second node, and the fourth switch device 1440 of the first node is coupled to the first switch device 1440 of the second node. Depending on the application, the system 1500 can include one or more additional server nodes, and the connection configuration between switches in the nodes can vary. Alternatively, the nodes can be connected using the NICs within each node system 1400, such as a pipelined Ethernet connection, or the like. Those of ordinary skill in the art will recognize other variations, modifications, and alternatives to this multi-node server system configuration.

Figure 16:
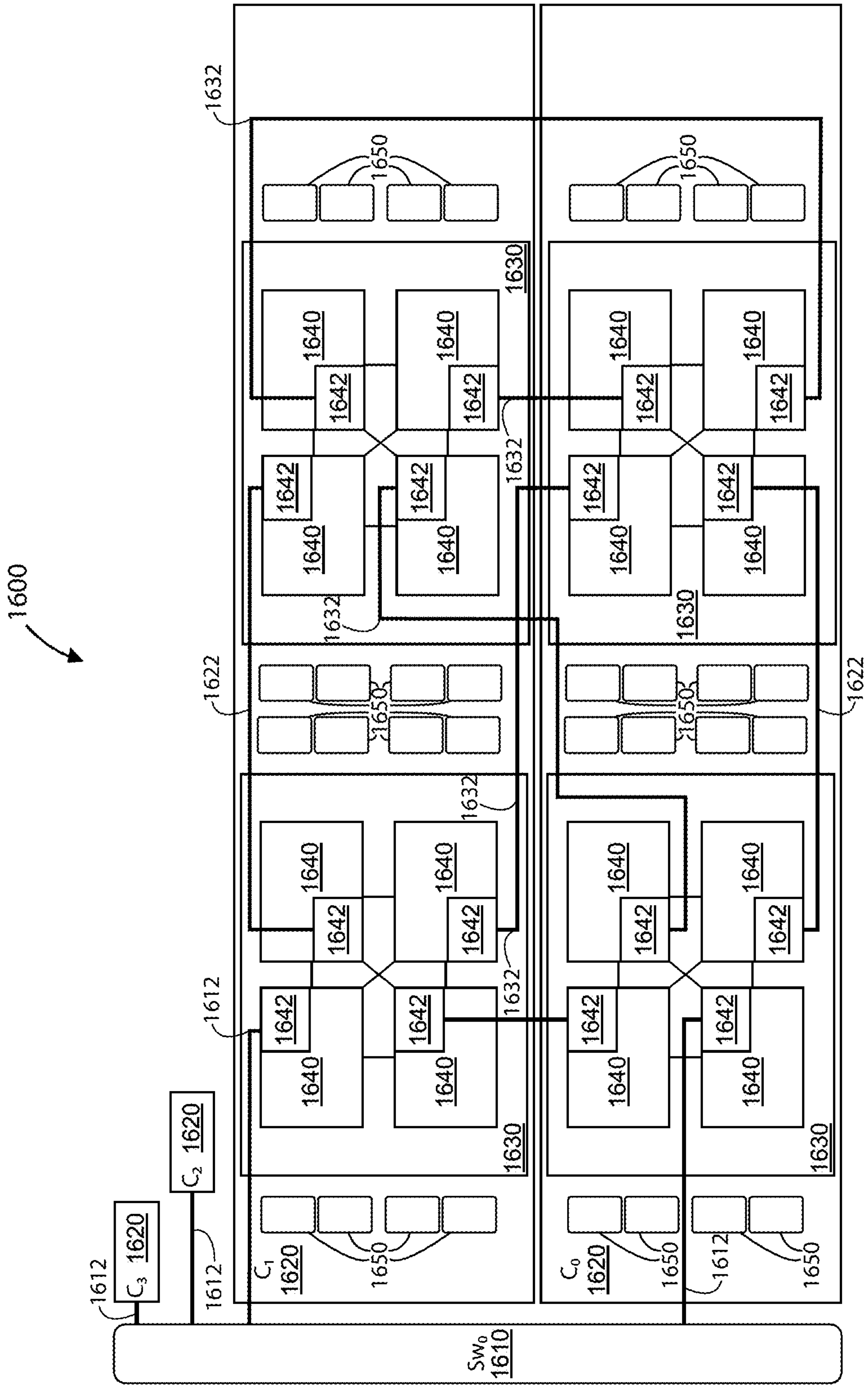
FIG. 16 is a simplified block diagram illustrating a portion of a server system according to an example of the present invention.

FIG. 16 is a simplified block diagram illustrating a portion of a server system according to an example of the present invention. As shown, the server system 1600 includes a switch device 1610 coupled to a plurality of PU card devices 1620. Similar to the server system 1400, this system 1600 includes four PU devices 1620 (denoted as $C_0$-$C_3$) in a card form factor (e.g., PCIe card, or the like). Here, the PU devices 1620 is configured similarly to the AI accelerator apparatus 102 of FIG. 1B with a eight chiplet devices 1640 formed overlying an interposer 1630 in two groups of four chiplets 1640 coupled together. Each of these chiplet devices 1640 also includes a connection interface 1642, such as a PCIe interface, or the like. Further, each group of chiplets 1640 is coupled to eight memory devices 1650 (e.g., DRAM, or the like). However, the specific number and configuration of these chiplet devices in the AI accelerator apparatus can vary and can include any of the configurations discussed previously.

The server system 1600 also includes details of various interconnections between chiplet devices 1640 within the same PU device 1620 and across different PU devices 1620. As shown in the expanded depiction of the first and second PU devices "$C_1$" and "$C_2$", the switch device 1610 is coupled to the connection interface 1642 of one of the chiplet devices 1640 of the first chiplet group in each PU device 1620 by connection pathways 1612. In a specific example, these connections pathways 1612 can include printed circuit board (PCB) pathways, cables, or the like. For both PU devices "$C_1$" and "$C_2$", a different chiplet device 1640 of the first chiplet group is also coupled to a different chiplet device 1640 in the second chiplet group via their connection interfaces 1642 by connection pathways 1622. In a specific example, these connection pathways 1622 can also include PCB pathways, cables, or the like.

Further, FIG. 16 shows that the remaining chiplet devices 1640 that were not coupled to the switch via connection pathways 1612 or coupled across chiplet groups via connection pathways 1622 are coupled to across the PU devices 1620 via their connection interfaces 1642 using bridge connection pathways 1632. More specifically, each of the two remaining chiplet devices 1640 in each group are coupled to chiplet devices 1640 of different chiplet groups in the other PU device 1620. The server system 1600 can include additional connections via connection pathways 1612 (switch-to-chiplet), 1622 (group-to-group), and 1632 (card-to-card) can be included to connect to other PU devices 1620 or in the case of a different configuration of chiplet devices 1640 in the AI accelerator apparatus. Those of ordinary skill in the art will recognize other variations, modifications, and alternatives.

In certain cases, multiple chiplets may be disposed on a same substrate with links between them. U.S. patent application Ser. No. 18/819,370 filed Aug. 29, 2024 titled "AI ACCELERATOR APPARATUS PACKAGED WITH BRIDGE CONFIGURED TO CROSS-CONNECT A PAIR OF CHIPLETS", is hereby incorporated by reference for all purposes.

Returning back to FIG. 1B, that particular embodiment shows a simplified AI accelerator apparatus with eight (8) chiplet devices configured in two (2) groups of four (4) chiplets per substrate member. This and other specific examples can be embodied in peripheral component interconnect express (PCIe) card form factors.

Figure 17:
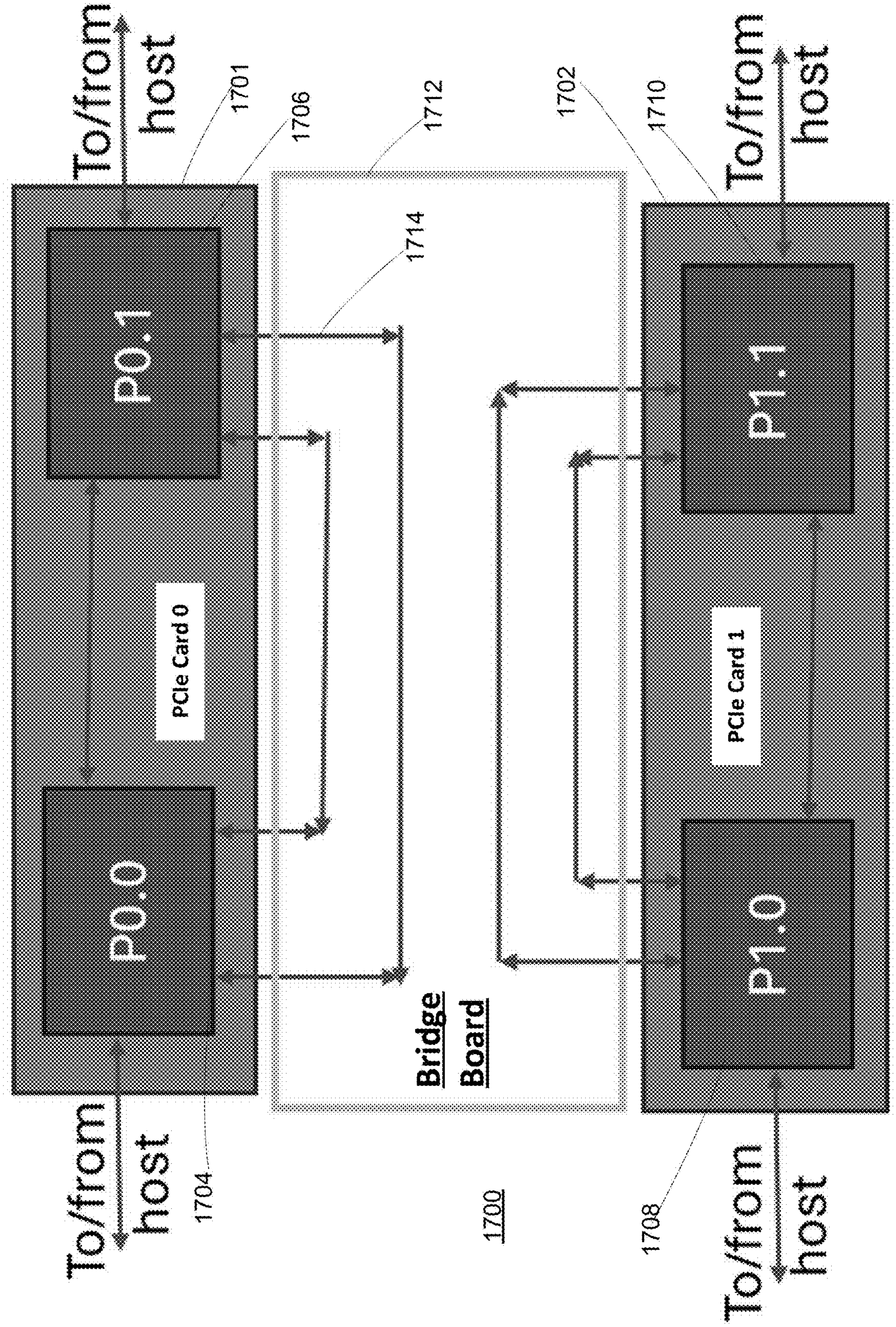
FIG. 17 shows a simplified view of one embodiment of a bridge board.

Under certain circumstances, it may be desirable to provide links between chiplets disposed on multiple substrates. FIG. 17 shows a simplified view of a system 1700 comprising two PCIe cards: card 0 1701, and card 1 1702. Each PCIe card includes two packages:

packages 0.0 1704 and 0.1 1706 of PCIe card 0, and
packages 1.0 1708 and 1.1 1710 of PCIe card 1.

In order to accomplish the execution of transformer computations in an efficient manner, under certain circumstances it may be desirable to distribute processing in parallel across different packages located on a same PCIe card. Accordingly, FIG. 17 shows a simplified view of a bridge module 1712 that is present between the two PCIe cards.

The bridge module 1712 is passive, in that is offers fixed links 1714 (comprising, e.g., x #channels each) between the packages. Here the passive bridge board is in a linear connection configuration, with each port of the package connected by a dedicated link to a port of the other package on the same PCIe card.

Figure 18:
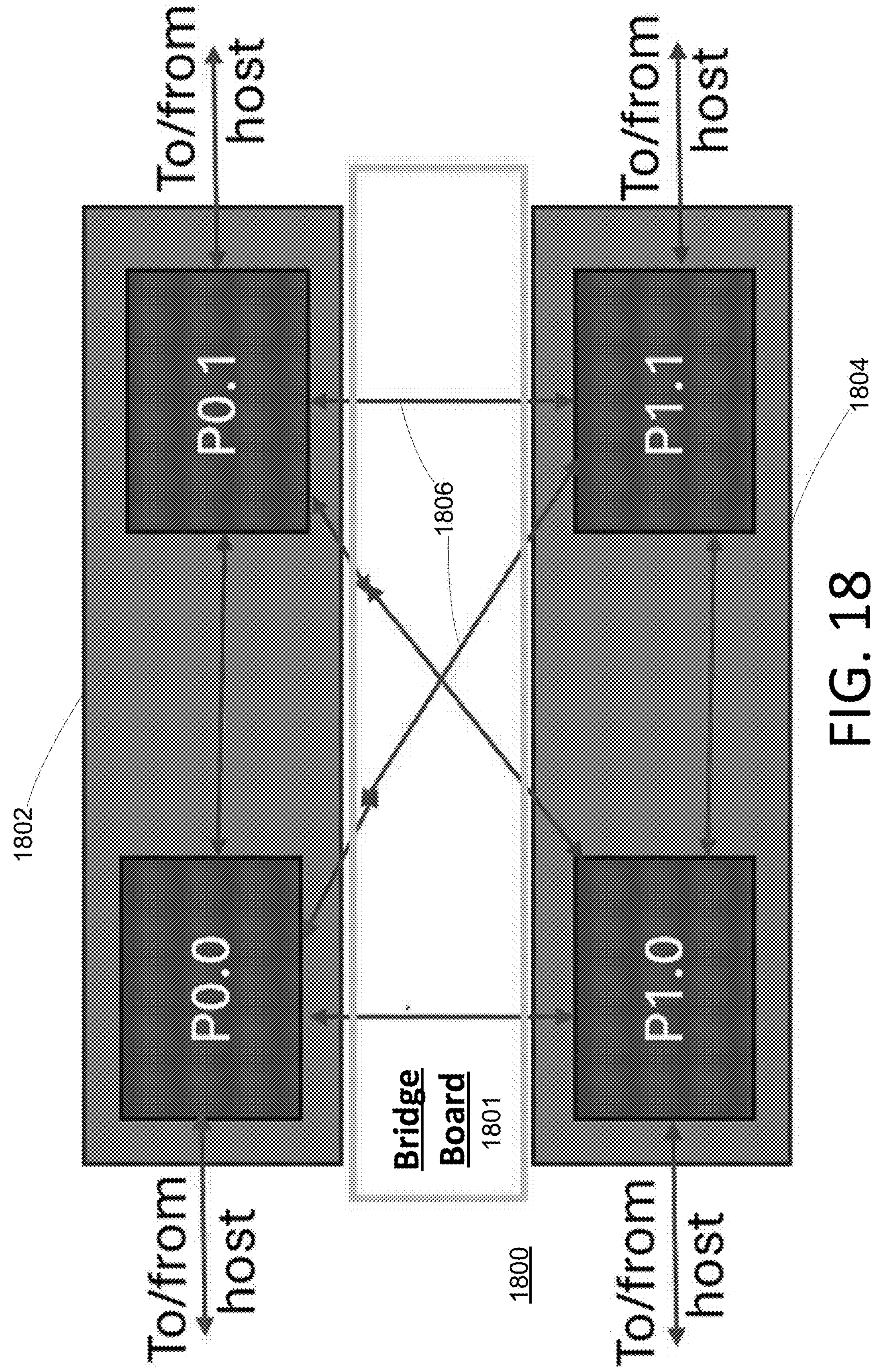
FIG. 18 shows a simplified view of another embodiment of a bridge board.

Depending on the embodiment, a bridge module may provide links between packages that are located on different substrates (e.g., PCIe cards). FIG. 18 shows another example of a system 1800 including a bridge module 1801 between two PCIe cards 1802 and 1804.

Here, the bridge module provides various links 1806 between:

a package and the other package located on the same PCIe card; and
a package and each package located on the other PCIe card.

The bridge board module of FIG. 18 offers even more flexibility as compared with the embodiment of FIG. 17. That is, complex transformer computations (and respective portions thereof) can be distributed across chiplets that are located on multiple different PCIe cards. Under certain circumstances, this may allow for parallel processing that enhances efficiency of operation of the AI accelerator.

However, it is noted that the bridge board module of FIG. 18 is again passive in nature. That is, the respective links between packages are fixed.

Accordingly, embodiments offer active bridge board modules comprising links that are not fixed. Rather, the links of an active bridge board module can be dynamically managed in order to actively distribute transformer computations across available processing resources (cards; packages; chiplets) in an efficient manner.

As used herein, the term "active" refers to the ability to change a link between nodes of a package. The term "dynamic" refers to the ability to change a link of an active bridge board module. Dynamic configuration of links can take place at a local level, without necessarily going back and forth to a host computer. Dynamic configuration can be accomplished using software in the Board Management Firmware/Firmware level.

Consider a specific embodiment similar to FIG. 18. There, a passive bridge board offers fixed links (×16) between any two of the four-chiplet (C4) packages. This provides connectivity between the chiplets of the four packages in a tensor parallel way (TP-4).

Specifically, tensor parallelism is a technique used to efficiently distribute AI workload across multiple processing units. Tensor parallelism is a technique that can be used to parallelize the computation of large models across multiple processing units (e.g., GPUs; TPUs; ASIC chiplets/cards), improving efficiency and speed in deep learning tasks. Tensor parallelism may be particularly useful in large-scale models (e.g., natural language processing —NLP; computer vision) where a model (e.g., transformer) may be too large to fit in a single memory.

Tensor parallelism splits a large tensor (e.g., a multidimensional array representing parameters or activations of a neural network) across multiple devices. Thus, each device processes a portion of the tensor in parallel. This can reduce memory overhead and improve computational throughput, allowing inference by larger models otherwise be too resource-intensive for a single device.

A matrix multiplication (MATMUL) has activation tensor and weight tensor. The weight tensor is split across multiple processing units. The activation may be split or replicated in each of the devices, depending on the tensor sharding strategy that is used.

Tensor sharding distributes data of a tensor across multiple devices (e.g., GPUs, TPUs, others) to facilitate parallel computation. The tensor is divided into smaller shards, so that different devices can work on different parts of the tensor simultaneously.

Two common approaches for tensor sharding are Row Parallel sharding, and Column Parallel sharding. In Row Parallel sharding, the tensor is divided along one of its dimensions (typically the first dimension, which often represents rows in a matrix-like structure). The splitting is done such that different devices work on different sets of rows. Each device gets a portion of the data, and all devices work in parallel on their subset of rows.

Column Parallel sharding divides the tensor along the second dimension (the columns). Each device is responsible for a subset of columns. Column parallel sharding may be beneficial for computations that can be parallelized along columns, such as batch-wise operations or certain linear algebra operations (e.g., multiplying matrices from the right side).

The collective that is used, will also depend upon sharding strategy. For Row parallel sharding, all-reduce is used. For Column Parallel sharding, all-gather is used.

Consider a MATMUL represented as [M×K]*[K×N]. When distributed across i devices as TP-i, row parallel is [M×K/i]*[K/i×N] on each device, followed by an all-reduce. Column parallel is [M×K]*[K×N/i] on each device, followed by all-gather.

In model inference, tensor parallelism reduces latency, offering the ability to aggregate more memory capacity, and/or offers the ability to aggregate memory bandwidth. In compute-bound AI workloads, tensor parallelism reduces latency due to aggregating compute resources—trillions or tera operations per second (TOPS). In memory-bound workloads, tensor parallelism aggregates more bandwidth and reduces latency.

Tensor parallelism can also help to improve batch sizes because of aggregation of memory capacity. This in turn provides better throughput.

Tensor parallelism may involve slicing. Instead of replicating entire model weights on each device, tensor parallelism divides the tensors (the multi-dimensional arrays used for model parameters) into smaller slices. Each device processes a portion of the tensor.

Tensor parallelism may be implemented in conjunction with various components of an AI model. This approach can be applied to different parts of the transformer architecture, including but not limited to attention layers, feedforward layers, or embeddings. For example, in a multi-head attention mechanism, the attention weights can be split across processing units.

As mentioned above, the passive bridge board of FIG. 18 may be useful to implement TP-4 tensor parallelism. However under some conditions it may be desired to run transformer workloads on only two (2) of the packages, resulting in (TP-2) tensor parallelism.

In such circumstances (where only two of the packages are being utilized), for a passive bridge board only a single link (×16) would be present between any two of the remaining packages. The other available links would go unused.

Thus in the case of TP-2 processing using a passive bridge board, at least one of the links (×16) of the sample apparatus may not be utilized. This can reduce efficiency of operation of the AI accelerator device.

Figure 19:
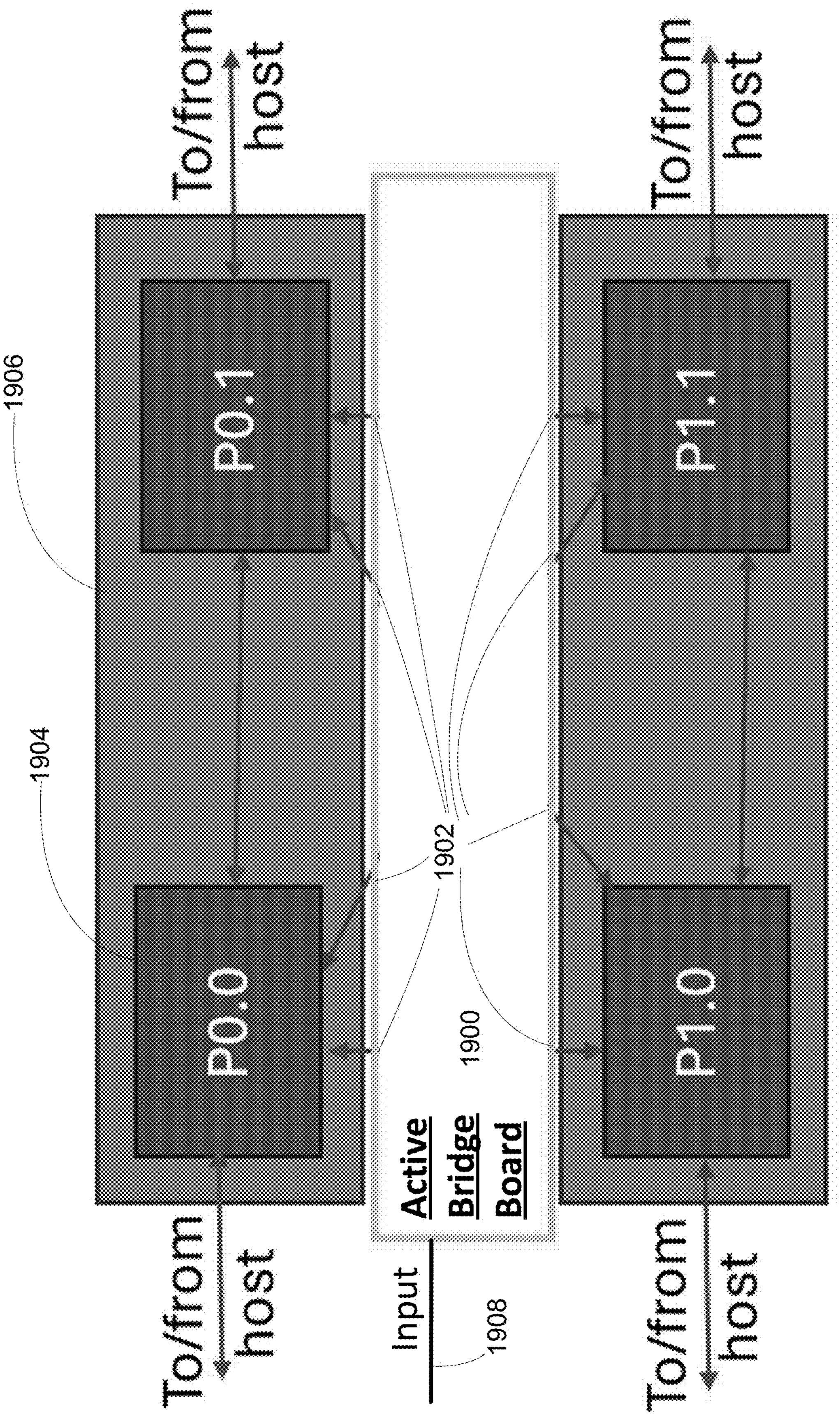
FIG. 19 shows a simplified view of an active bridge board according to an embodiment.

Accordingly, as shown in FIG. 19, AI Accelerator systems of particular embodiments may be provided with an active bridge board module 1900 to dynamically reconfigure connectivity of links 1902 between different packages 1904 on different PCIe cards 1906. This dynamic link configuration is based upon a received input 1908.

As described at least in connection with the following specific examples, in some embodiments the active bridge board may be implemented using an input that is provided to an analog switch. In particular embodiments the active bridge board may be implemented using a select input that is provided to an analog multiplexer (mux) comprising multiple analog switches in the form of MOS transistors.

EXAMPLES

Embodiments an AI accelerator apparatus may employ chiplet devices that are deployed on different packages on two or more PCIe cards. Such a configuration can be employed to facilitate efficient utilization of processing resources (e.g., in parallel), during execution of computations for transformer applications. Such multiple PCIe cards may be coupled to one another via common bridge boards.

Figure 20:
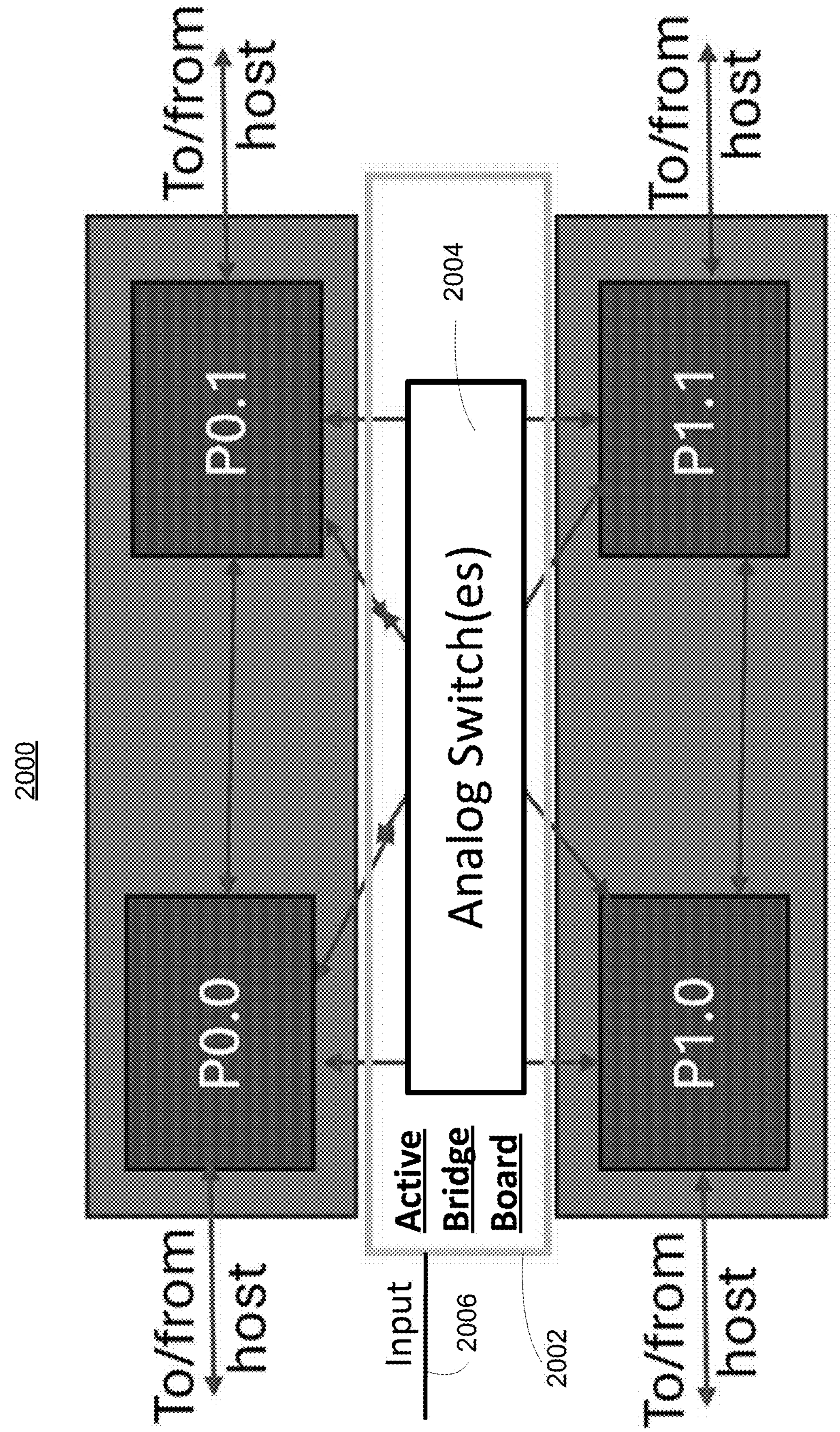
FIG. 20 shows a simplified view of an active bridge board including analog switch(es) according to an embodiment.

FIG. 20 shows one specific embodiment 2000 of a system wherein an active bridge board 2002 comprises a network of analog switches. Depending upon the input 2006 to the bridge board, this apparatus affords dynamic reconfiguration of links between packages on PCIe cards. This configurability, in turn, can allow two links when running an AI workload with TP-2, promoting efficient parallel processing of transformer computations by processing resources.

Figure 21:
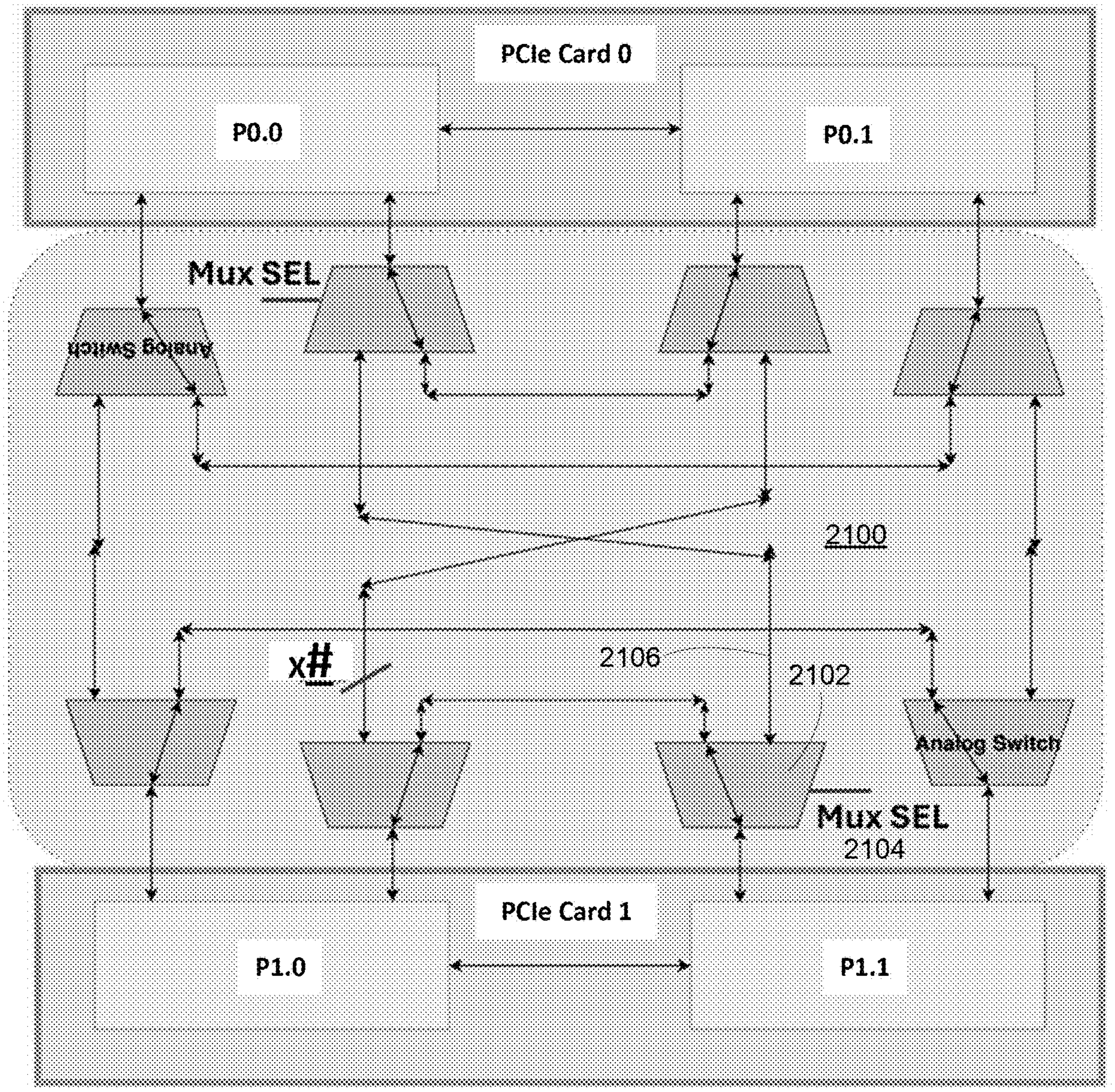
FIG. 21 shows a detailed view of an active bridge board embodiment including an analog switch(es).

FIG. 21 shows a detailed view of an active bridge board comprising a network of analog switches 2102. In certain embodiments, these analog switches may be protocol independent. Here, the analog switches are 1:2.

The state of the switches is controlled based upon a received Mux SEL input 2104. Depending upon the input, the analog switches are dynamically connected in various configurations to create a plurality of respective (x#) 2106 links between chiplets that are present in the packages of adjacent PCIe cards.

Figure 22:
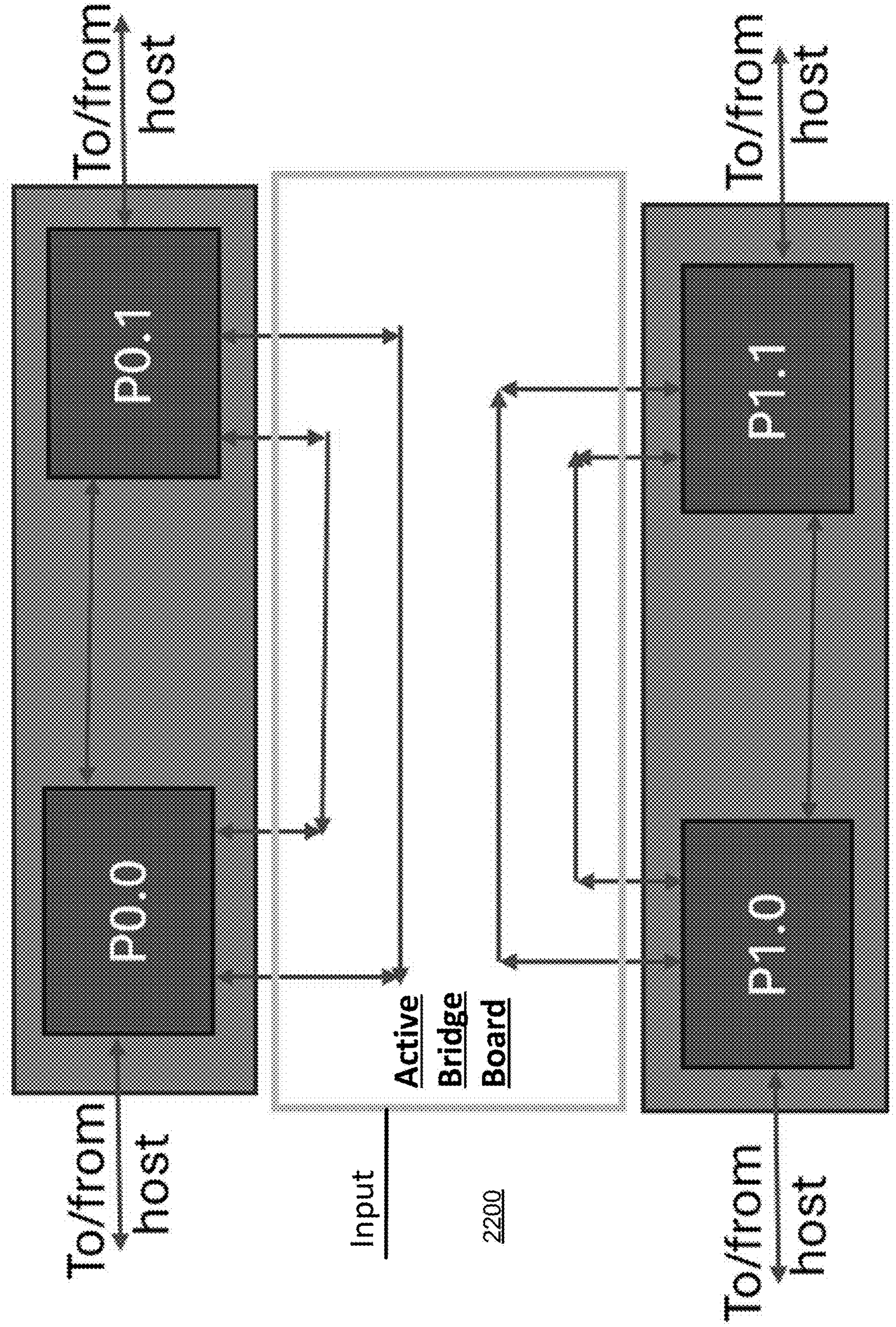
FIG. 22 shows an embodiment of an active bridge board dynamically configured in a linear connection configuration.

For example, FIG. 22 shows a simplified example wherein the input to the active bridge board dynamically configures it to be in the linear connection state. In that state, there are three links between packages on a same substrate.

Figure 23:
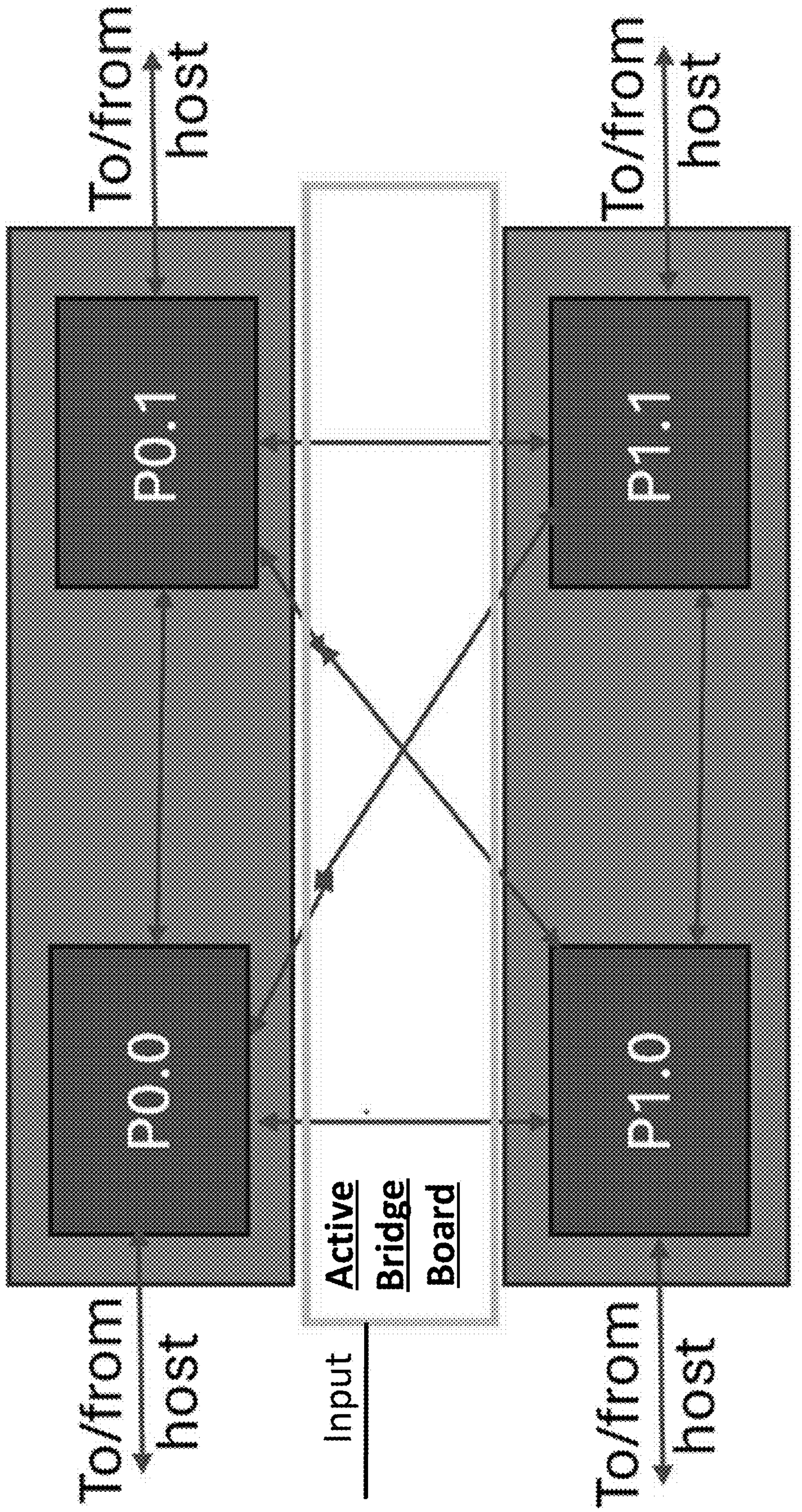
FIG. 23 shows an embodiment of an active bridge board dynamically configured in a TP-4 tensor parallel configuration.

FIG. 23 shows a simplified example wherein the active bridge board is dynamically configured by the input to be in the TP-4 state. In that state, there is a single link between each of the packages.

Figure 24:
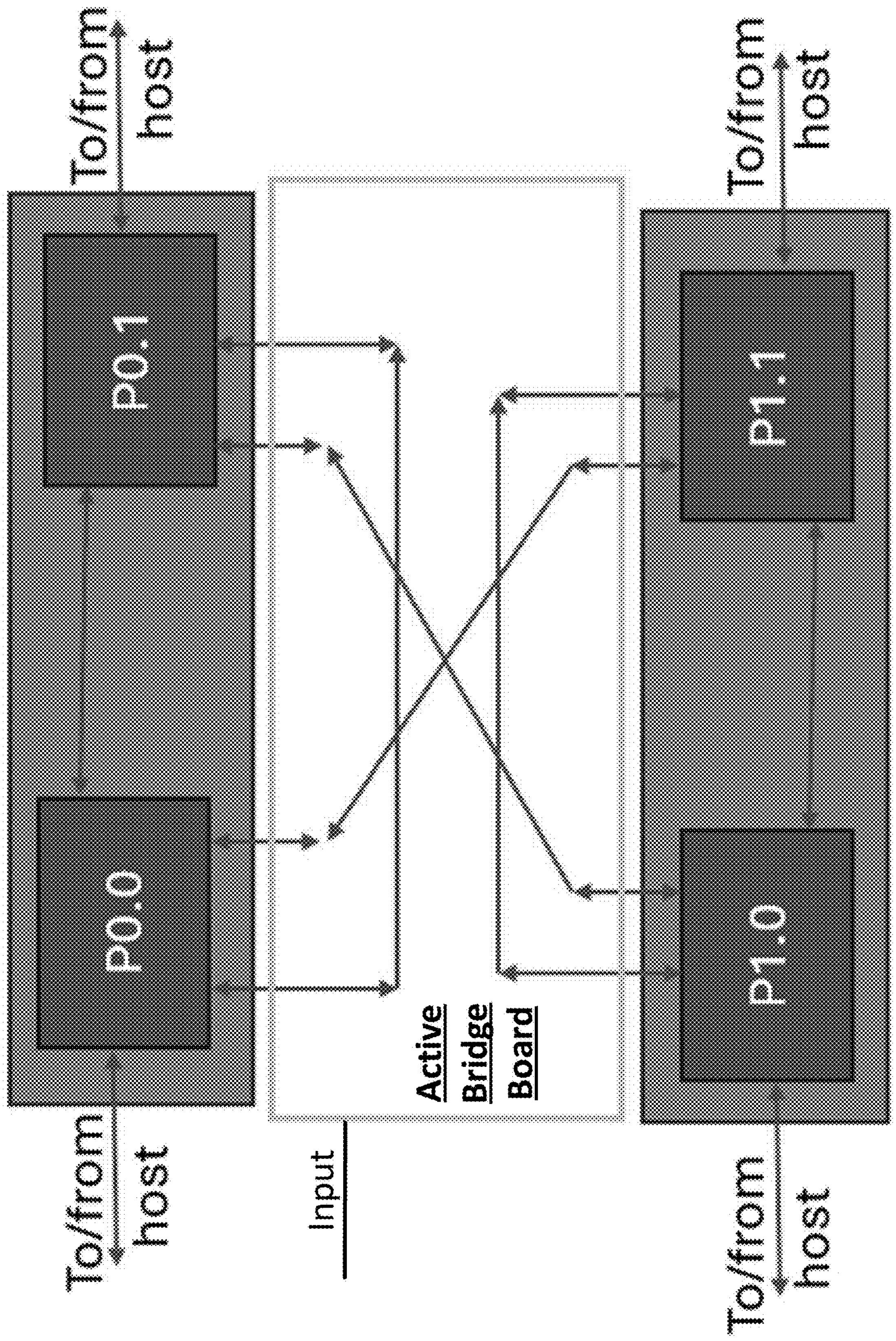
FIG. 24 shows an embodiment of an active bridge board dynamically configured in a TP-2 tensor parallel configuration.

FIG. 24 shows a simplified example where the active bridge board is in the TP-2 state. In that state, two links are present between each of P0.0/P0.1, and between each of P1.0/P1.1.

It is noted that the above example features an active bridge module comprising a network of analog switches. In certain embodiments, the network of analog switches may be in the form of a multiplexer.

Figure 25:
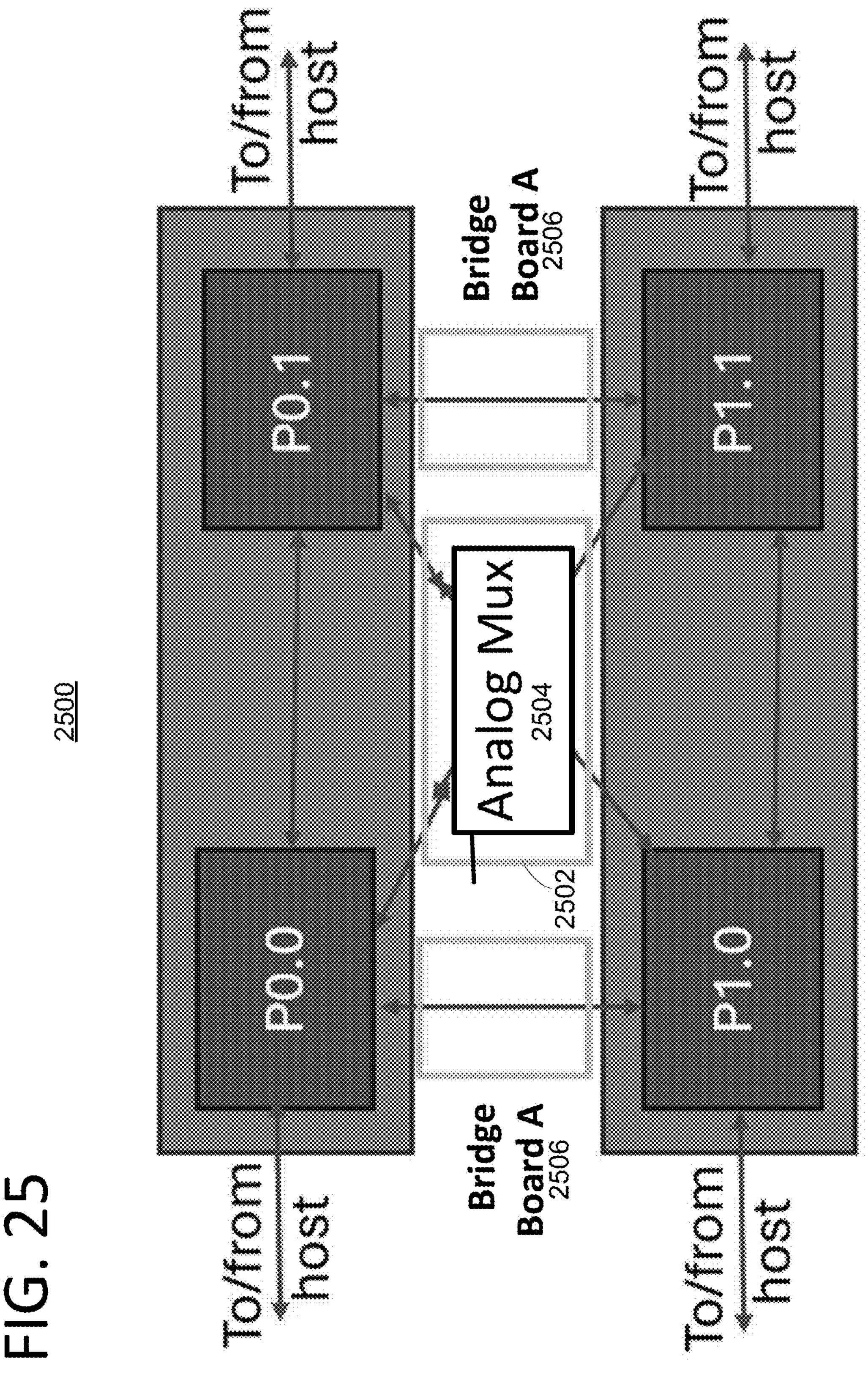
FIG. 25 shows a simplified embodiment of an active bridge board module including an analog multiplexer.

FIG. 25 shows an embodiment of a system 2500 comprising an active bridge board 2502 featuring an analog multiplexer 2504. This multiplexer provides links connecting diagonally-disposed packages (e.g., P0.0 and P1.1; P0.1 and P1.0).

Figure 25A:
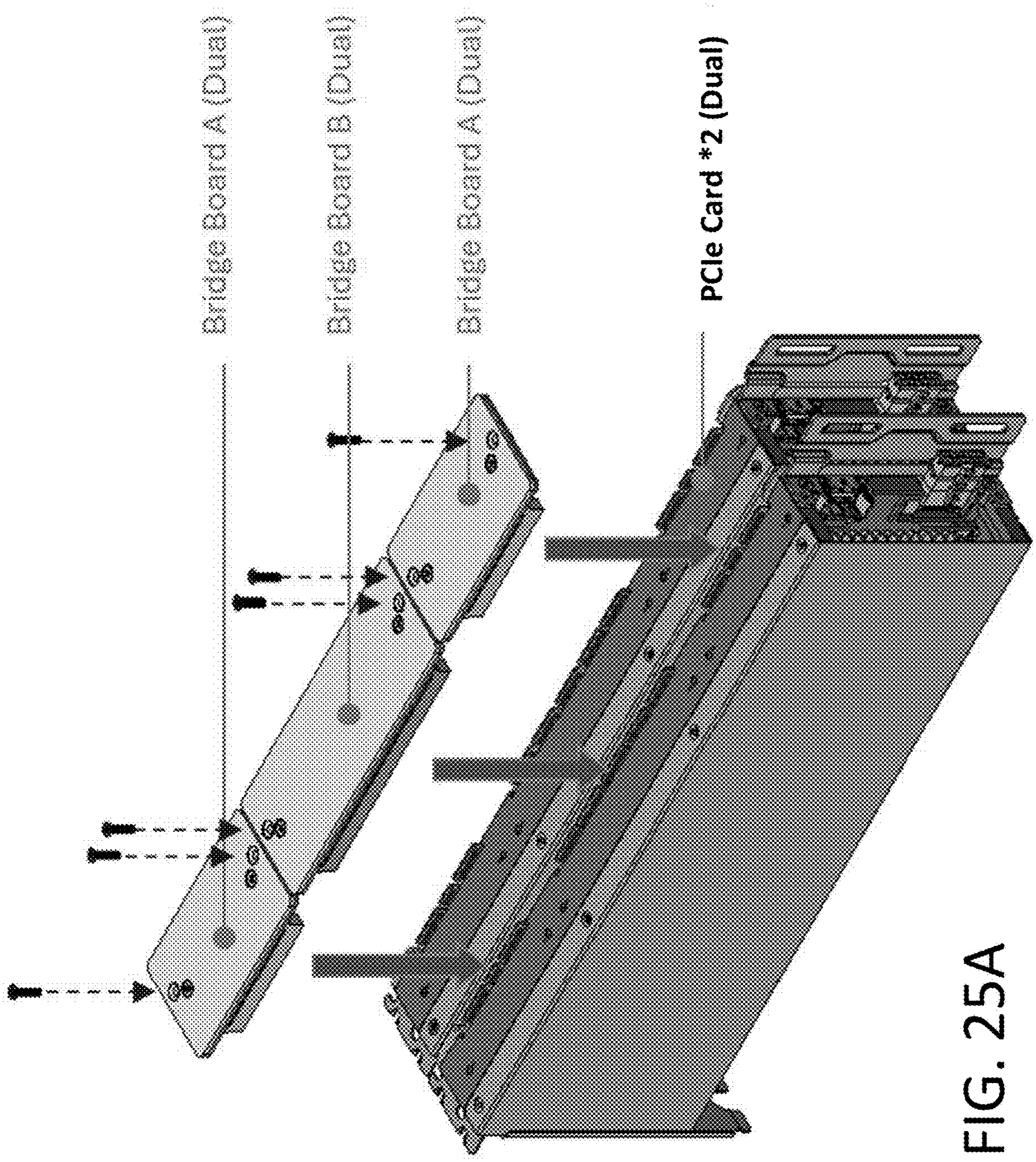
FIG. 25A shows an embodiment with adjacent cards connected to an active bridge board module.

The embodiment of FIG. 25 comprises additional, passive bridge boards 2506 (e.g., of Type "A"). These provide fixed links connecting adjacent packages (e.g., P0.0 and P1.0; P0.1 and P1.1). FIG. 25A shows a simplified exploded view of the system comprising multiple bridge boards and the dual PCIe cards.

Figure 25B:
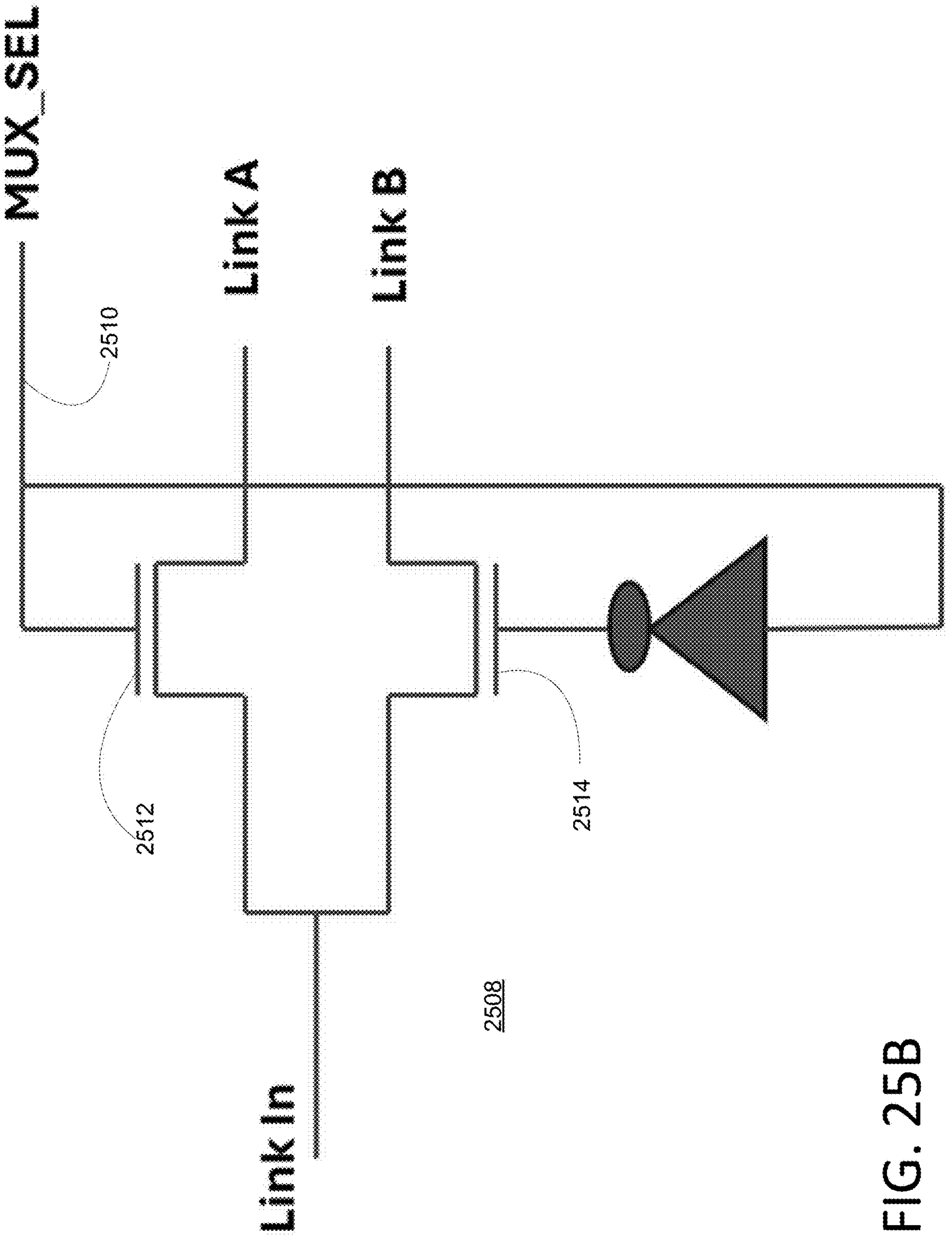
FIG. 25B shows a circuit diagram of an active bridge board according to an embodiment.

FIG. 25B shows a simplified circuit diagram illustrating an embodiment of an analog 1:2 switch 2508 of a mux present in an active bridge board. Depending upon the value of the MUX_SEL input signal 2510 (and its inverse) as communicated to the gates of the respective paired CMOS transistors 2512, 2514, the switch will operate to connect Link In with either of Link A or Link B.

Figure 25C:
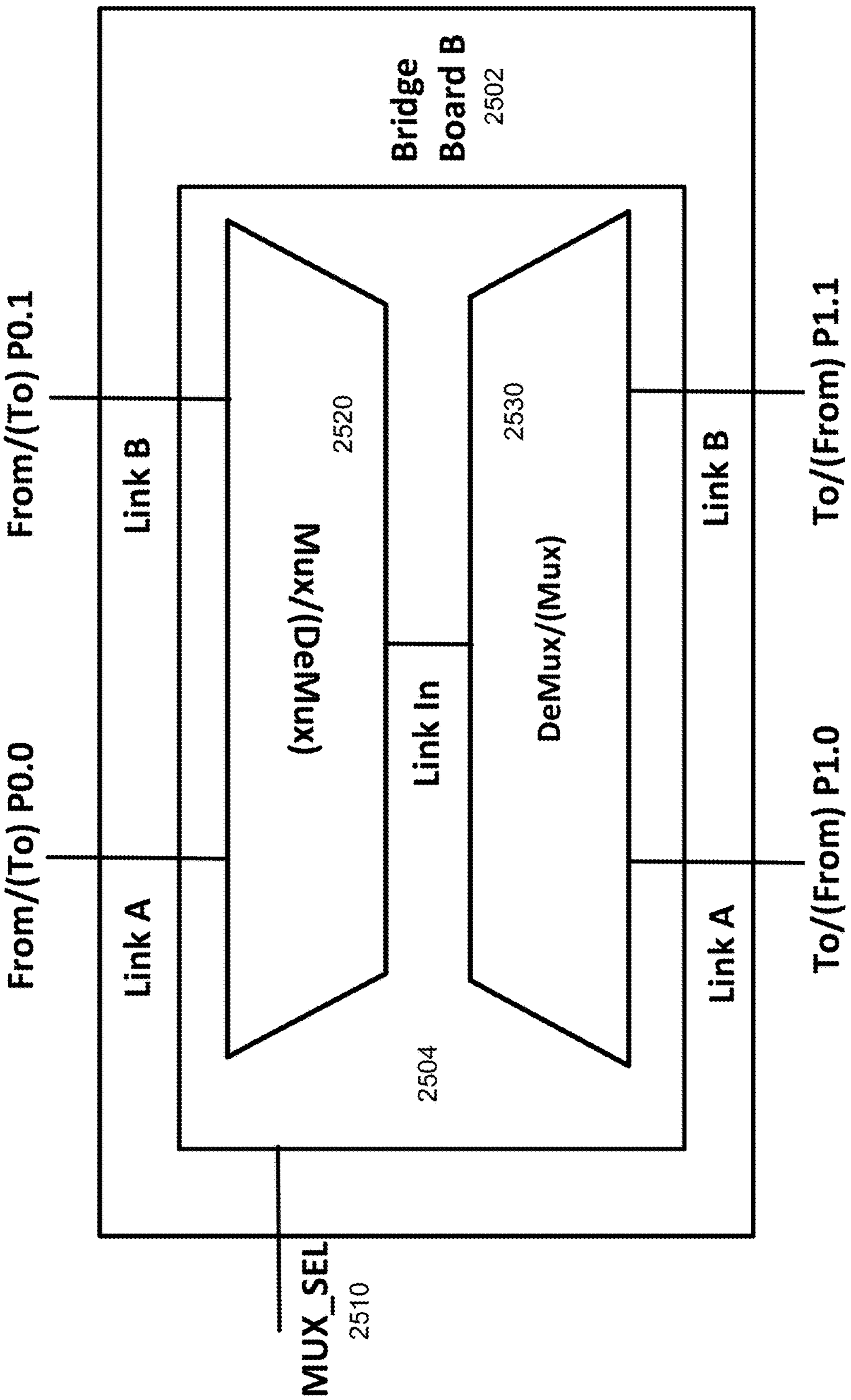
FIG. 25C shows a detailed view of an analog multiplexer.

FIG. 25C shows a simplified view of an embodiment of the analog multiplexer structure. This comprises two components 2520 and 2530.

A multiplexer is a combinational circuit that selects one of several input signals and forwards the selected input to a single output line. A multiplexer has multiple input lines (e.g., 2n2n inputs for nn selection lines) and a single output line.

Selection lines are binary inputs that select which of the multiple input signals will be sent to the output. Internally, the multiplexer can be a series of electronic switches (e.g., transistors) that connect the selected input to the output while disconnecting the others. When a specific combination of selection lines is activated, the corresponding switch closes, allowing the associated input signal to pass through to the output.

In one mode of operation (top-to-bottom in FIG. 24C) controlled by the select input, component 2520 functions as a multiplexer having inputs A and B to packages 0.0 and 0.1, respectively. The output of component 2520 connects to the input (Link In) of component 2530 that is acting as a demultiplexer, to provide an output to Links A and B (packages 1.0 and 1.1, respectively).

In another mode of operation (bottom-to-top in FIG. 24C) controlled by the select input, component 2530 functions as a multiplexer having inputs A and B to packages 1.0 and 1.1, respectively. The output of component 2530 connects to the input (Link In) of component 2520 that is acting as a multiplexer to provide an output to Links A and B (packages 0.0 and 0.1, respectively).

Figure 25D:
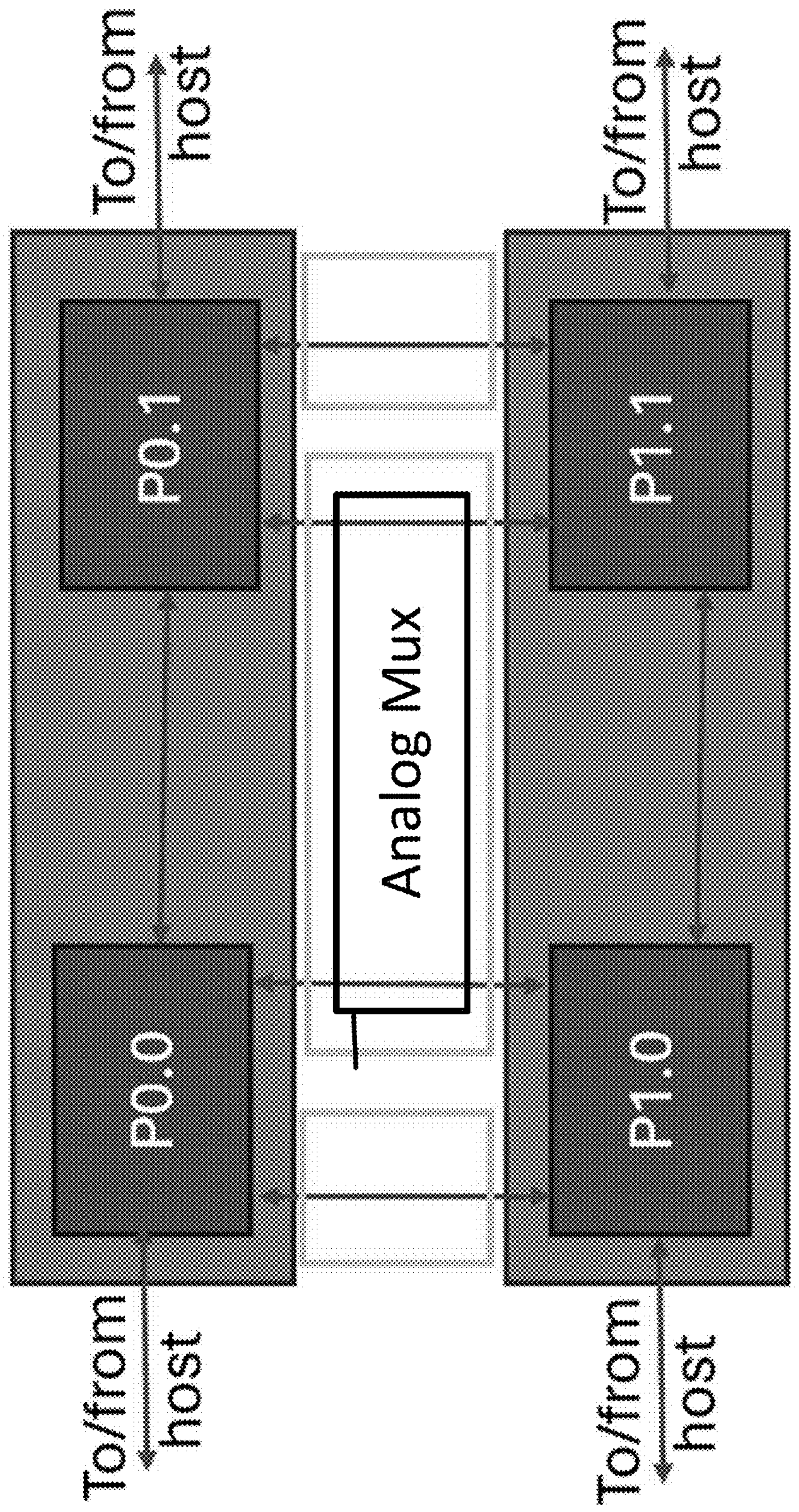
FIG. 25D shows an embodiment of an active bridge board dynamically configured in a TP-2 tensor parallel configuration.

As shown in FIG. 25D, depending upon the select input the active bridge board allows the system to efficiently function with TP-2 tensor parallelism, with two links between each of P0.0/P1.0 and between each of P0.1/P1.1. With a different select input, the system can alternatively function with TP-4 parallelism (e.g., in the manner shown in FIG. 23) with diagonal links established between P0.0/P1.1 and between P0.1/P1.0.

Figure 26:
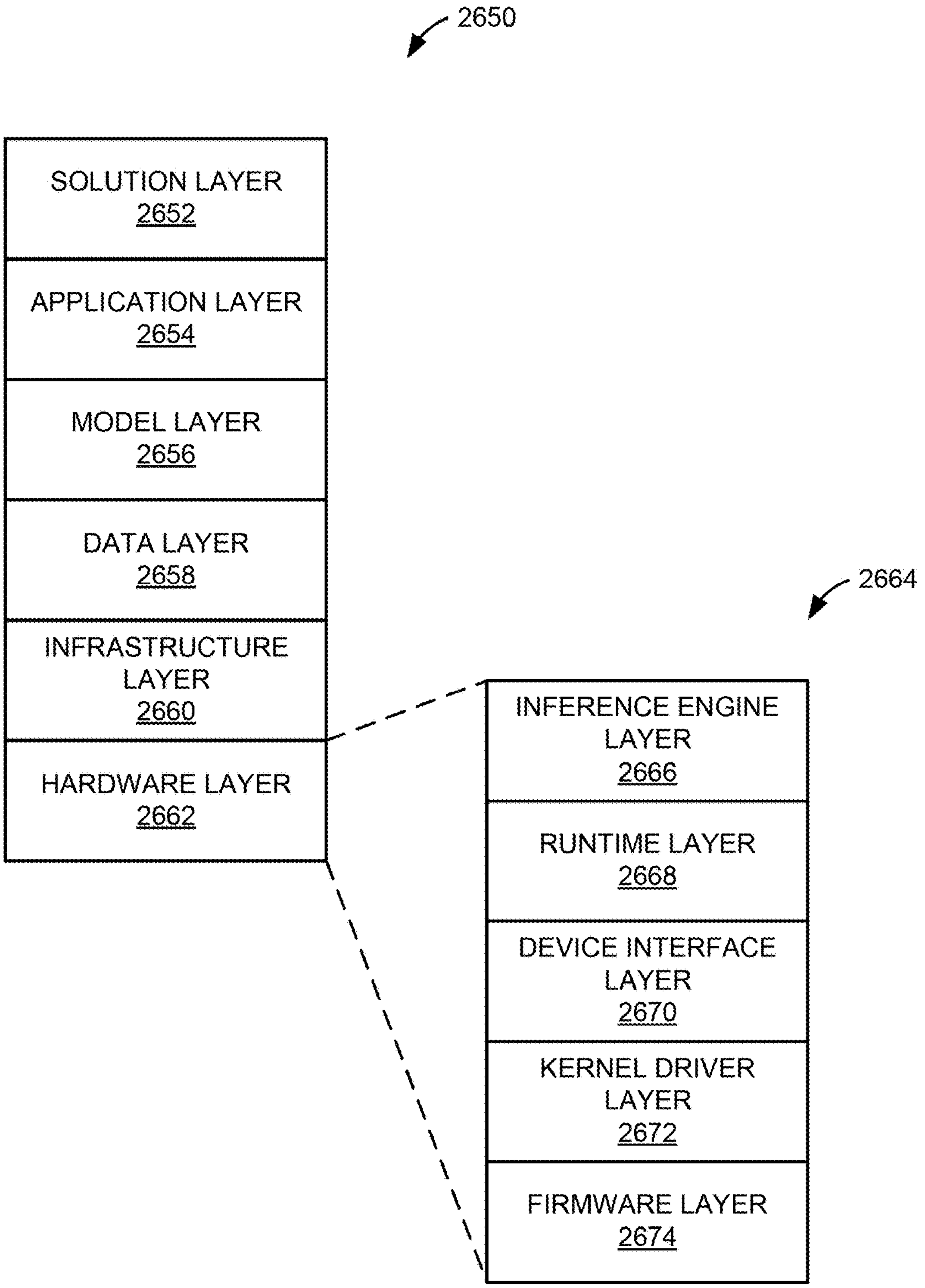
FIG. 26 illustrates a logical or software layer diagram according to some embodiments.

The input to the active bridge board may be based upon an instruction that is provided by software. FIG. 26 illustrates a logical or software layer diagram according to some embodiments. In FIG. 26 a stack 2650 is illustrated including a solution layer 2652, an application layer 2654, a model layer 2656, a data layer 2658, an infrastructure layer 2660, and a hardware layer 2662. Additionally, hardware layer 2662 may include an inference engine layer 2664, a runtime layer 2666, a device interface 2668, a kernel driver layer 2670, and a firmware layer 2672.

In various embodiments, solution layer 2652 may be an AI application used by a user to enter requests, receive responses, and the like. Examples of such solutions include chatbots, virtual assistants, and the like. Application layer 2654 may include sets of APIs and UIs used to write the AI application, or the like. Model layer 2656 may include pre-trained AI models, such as large language models (LLMs), and the like. In some embodiments, any number of pre-trained LLMs may be used, such as offered by Open AI, Google (e.g. BERT), Meta (e.g. LLaMA), and the like. Data layer 2658 may include storage and retrieval of input and output data, and the like. Infrastructure layer 2660 may include management of physical or logical servers (e.g. virtual machines), containerization of environments, and the like.

In some embodiments, hardware layer 2662 may include management of the execution of AI hardware, such as AI computation system 2600 discussed above. As illustrated in FIG. 26, hardware layer 2662 may include a number software layers 2664 for controlling the AI hardware. In various embodiments, inference engine layer 2666 enables use of pre-trained AI models and user input, e.g. a user query or a user prompt, to provide responsive outputs, e.g. predictions, text answer, etc. Runtime layer 2668 provides the libraries and frameworks to support execution of the operations specified by inference engine layer 2666. Device interface 2670 facilitates instruction and data communication to and from the AI hardware to the software layers described above, abstracting complexity of the AI hardware. Kernel driver layer 2672 is used to manage actual physical communication between an operating system of the AI hardware and the hardware devices. Firmware layer 2674 includes low-level software control and initialization of AI hardware, and is typically loaded into AI hardware at boot time, or the like.

The stacks above are merely representative of some embodiments of the present invention. In other embodiments, the functionality described herein may be transferred to other layers than described above; some functionality may be omitted; and the like. In other embodiments, some but not all layers are provided by a single source. For example, AI hardware and hardware layer 2662 may be provided by a first vendor, solution layer 2652 may be provided by a second vendor, and the remaining layers may be provided by a third vendor, for example as a software-as-a-service (SaaS), or the like. Accordingly, in light of the present disclosure, other categorizations of the above are contemplated in alternative embodiments of the present invention.

It is noted that computations of an AI workload that are sought to be accelerated in parallel using an active bridge module, may be performed digitally. While the above has focused upon embodiments of active bridge modules featuring analog switches and/or multiplexers, alternative embodiments utilizing digital switch(es) may also be employed.

Figure 27:
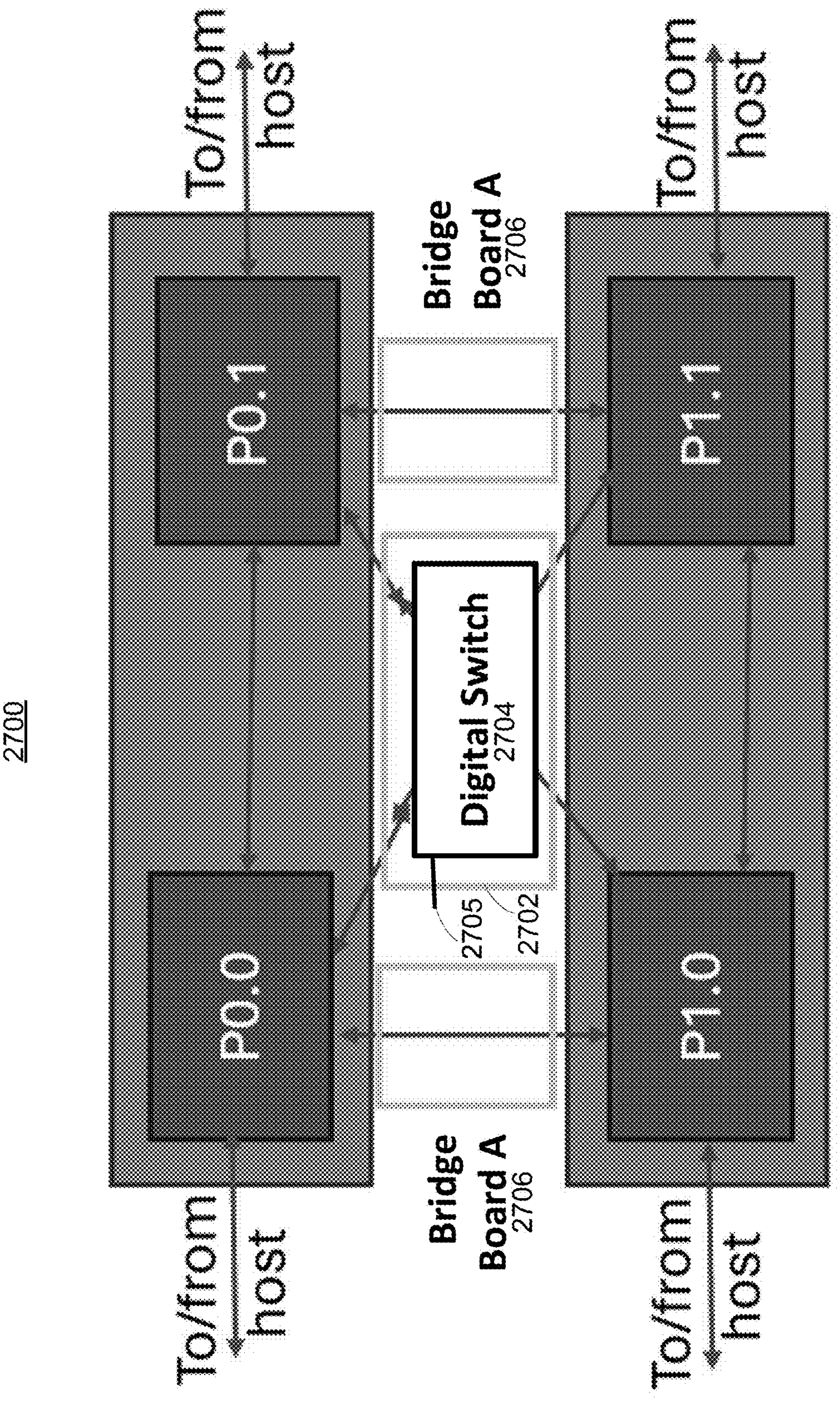
FIG. 27 illustrates a simplified view of an embodiment of an active bridge board including a digital switch.

For example, FIG. 27 shows a simplified view of an embodiment of an active bridge board module 2702 including a digital switch 2704 that is controlled by an input 2705. Passive bridge boards 2706 provide fixed links connecting the adjacent packages that are present on the substrates.

Figure 28:
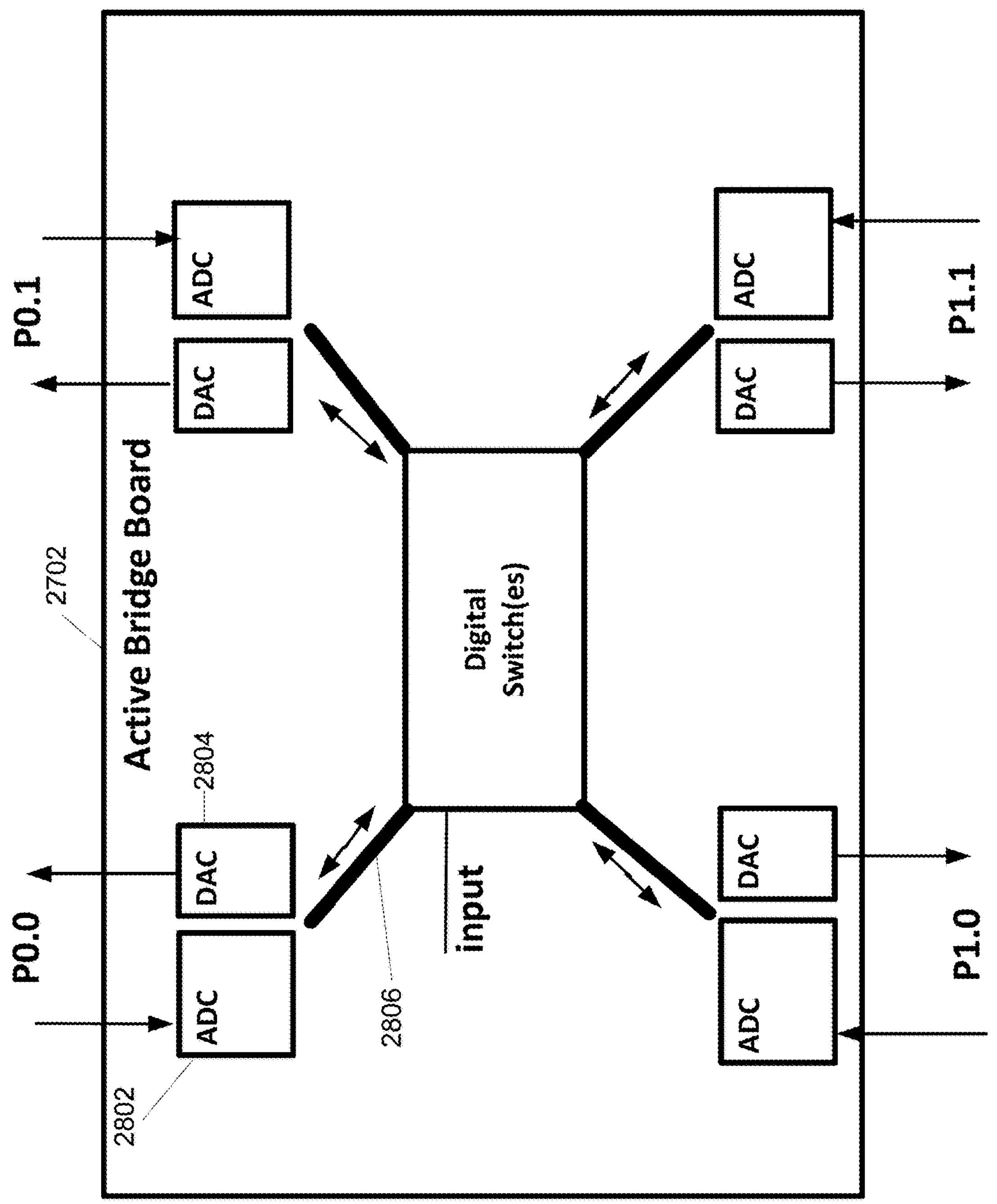
FIG. 28 illustrates a detailed view of an embodiment of an active bridge board including analog to digital conversion.

The active bridge module itself may include converters between signals in analog and digital form. FIG. 28 shows a simplified view of an embodiment of an active bridge board having ports in respective communication with packages P0.0, P0.1, P1.0, and P1.1.

An analog-to-digital converter (ADC) 2802 is present at each port. The ADC is a device that transforms incoming analog signals (which can vary continuously) from a package, into digital signals (which represent discrete values) for communication to the digital switch(es) of the active bridge board.

A digital-to-analog converter (DAC) 2804 is also present at each port. The DAC is a device that transforms incoming digital signals from the digital switch(es) of the active bridge board, into analog signals for communication to a package.

The ADC is configured to perform sampling—measuring an amplitude of an incoming analog signal at discrete intervals. The sampling rate determines how frequently the signal is measured. According to the Nyquist Theorem, to accurately reconstruct the original analog signal, the sampling rate must be at least twice the highest frequency present in the analog signal.

An ADC is also configured to perform quantization. Each sampled value is assigned a discrete digital value. This involves rounding the continuous amplitude to the nearest value within a defined range.

On the active bridge board, the digitized signals are communicated to the digital switch for routing, via links 2806. These links may be formed from copper metallization.

As noted above, while particular embodiments have been shown featuring two adjacent substrates bearing two packages each, this is not required. Embodiments are not limited to implementing particular types of parallelism (e.g., TP-4; TP-2). Rather, embodiments can scale generally to implement parallel processing utilizing larger numbers of package(s) and/or card(s).

However, with larger/more complex configurations, space concerns and/or link length may render it difficult for a bridge board module to rapidly and accurately communicate signals in electrical form. Accordingly, certain embodiments may provide for the communication of optical signals in an active bridge module as controlled by digital switch(es).

Figure 29:
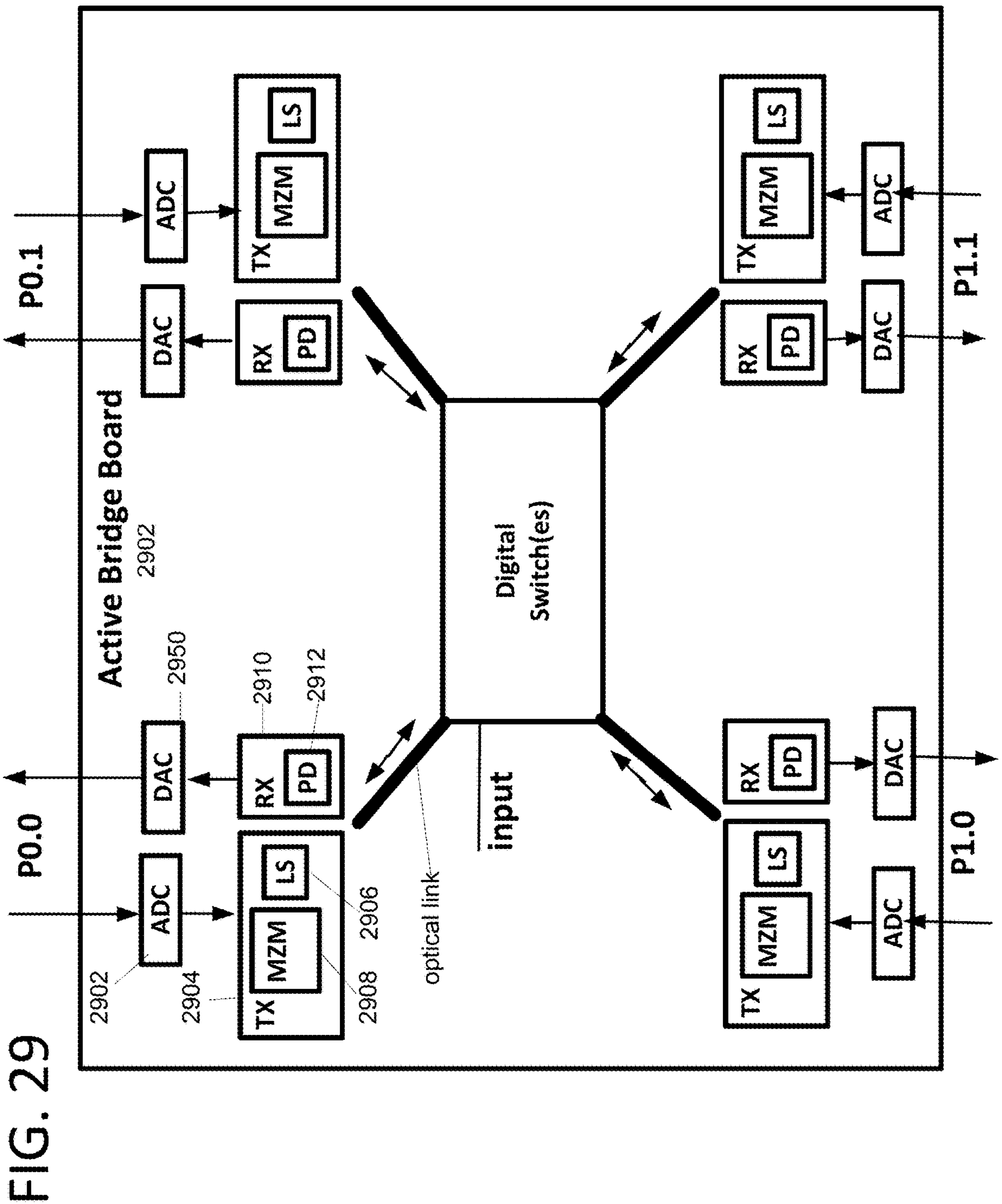
FIG. 29 illustrates a detailed view of an embodiment of an active bridge board including electrical to optical conversion.

FIG. 29 shows a simplified view of an embodiment of an active bridge board having ports in respective communication with packages P0.0, P0.1, P1.0, and P1.1.

An analog to digital converter 2902 is present at each port. The analog to digital converter is in turn in communication with an optical transmitter (TX) 2904. This TX comprises a light source 2906, which may be a source of coherent light (e.g., a laser).

The TX also comprises an optical modulator 2908, e.g. a Mach Zehnder Modulator (MZM). The MZM uses interference principles to manipulate light.

Specifically, an MZM is used to modulate an optical signal. It takes an incoming light beam (from the light source) and varies its amplitude or phase based on an electrical input signal.

A MZM comprises two beam splitters and two arms of optical fiber or waveguides. The light is split into two paths, where it can be subjected to different phases depending on the voltage applied to electrodes along the waveguides.

Application of an electrical signal changes the refractive index of the material in one of the arms, causing a phase shift. The two beams recombine at the second beam splitter, resulting in constructive or destructive interference, resulting in varying intensity of the output light.

Light output from the transmitter is communicated along optical link 2910. This optical link may comprise a silicon based waveguide, and/or as described in an alternative embodiment below may also comprise an optical cable.

An optical receiver (RX) 2910 is also present in communication with each optical link. The optical receiver comprises an optical demodulator 2912, indicated in this particular embodiment as a photodiode (PD).

Demodulation is the process of recovering the original information signal from a modulated optical signal. One type of optical demodulator is a Mach-Zehnder demodulator. This extracts information from a modulated optical signal, as present in (coherent) optical communication systems. Similar to the MZM, the demodulator comprises a Mach-Zehnder interferometer setup where the incoming modulated light is split into two paths.

In demodulator operation, the light paths can introduce different phase shifts. When they recombine, the resulting interference pattern reveals the information encoded in the signal. This can involve detecting the intensity variations or analyzing the phase differences.

Apart from MZM demodulators, there are several other types of optical demodulators.

- Direct detection. A photodetector (e.g., the PD of FIG. 29) converts the optical signal into an electrical signal.
- Coherent detection. The optical signal is mixed with a reference signal to recover the information signal.
- Differential Phase Shift Keying (DPSK) demodulator. A delay line interferometer that can be configured to be tunable, semi-tunable, or passive.
- Differential Quadrature Phase Shift Keying DQPSK demodulator. Converts quadratural phase modulation into amplitude modulation
- Other demodulation approaches. Including, e.g., Laser-scanning; Tunable filtering; CCD spectrometer measurement; Arrayed Waveguide Grating (AWG) demodulation.

In the particular embodiment of FIG. 29, a digital to analog converter 2950 is also shown as being in communication with the Rx. Such a DAC has been described above.

While the particular embodiment of FIG. 29 shows the analog/digital and electrical/optical converters as being separate and distinct, this is not required. For example, integrated analog to optical (AOC) converters may combine multiple functions, such as digital-to-analog conversion and signal processing.

Converting the AI workload signal into optical (rather than electrical) form, can offer one or more benefits. One possible benefit is the ability for long-distance transmission with minimal signal degradation.

Another possible benefit is high bandwidth, as high data rates can be supported. Still another possible benefit is reduced interference, because (as compared with electrical signals) optical signals are less susceptible to electromagnetic interference.

Figure 30:
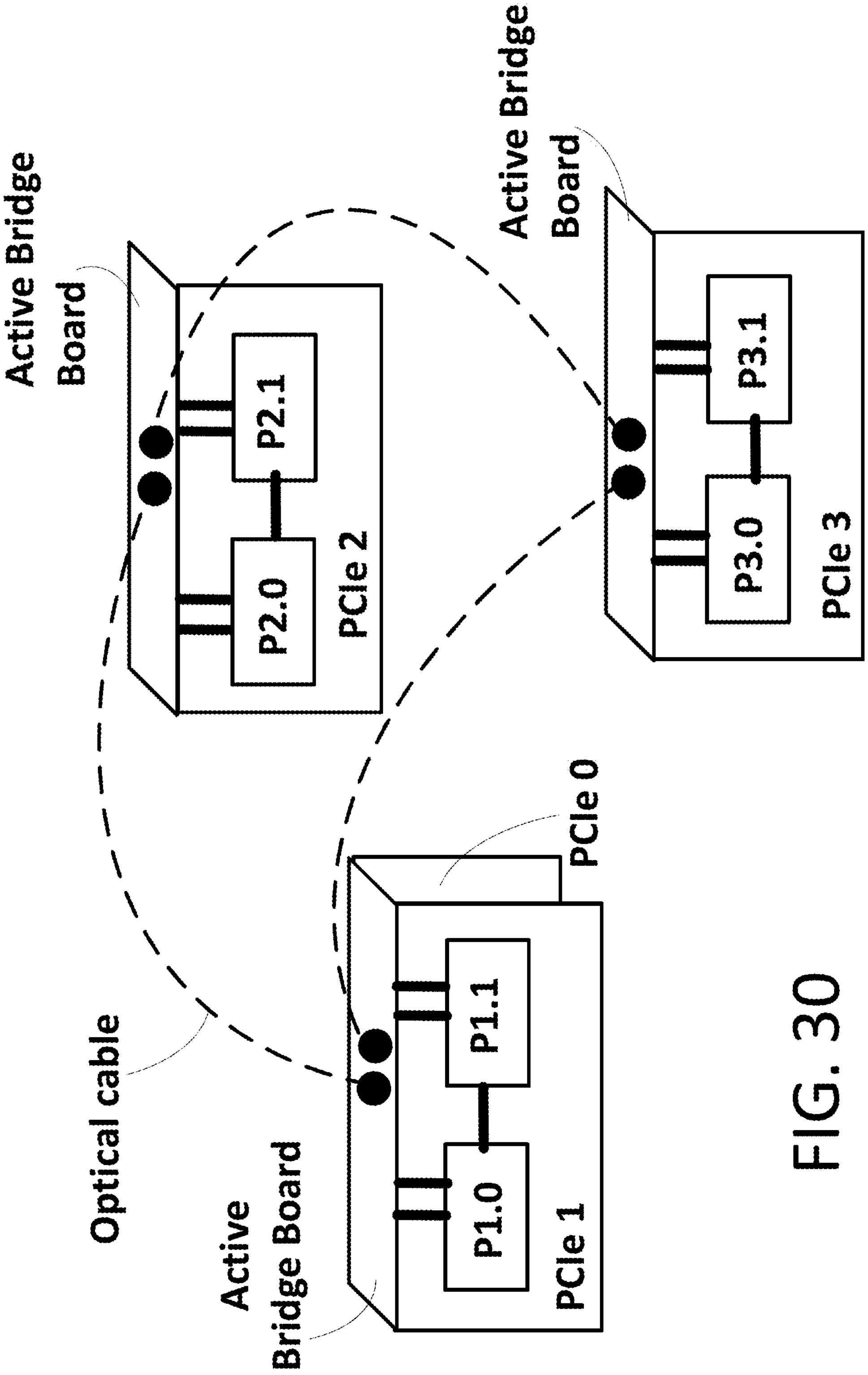
FIG. 30 illustrates a view of an embodiment of a system comprising active bridge boards connected by optical cables.

FIG. 30 shows a simplified view of an AI accelerator system comprising multiple active bridge board modules that are connected by optical cables. Here, only two PCIe card substrates (PCIe 0 and PCIe 1) are physically adjacent. Other PCIe cards (PCIe 2 and PCIe 3) are physically distant. However, their respective packages are capable of dynamic configuration with packages on the other cards, to flexibly achieve tensor parallelism of a desired degree.

This is achieved by using optical cabling as part of the link(s). Upon the active bridge board module, another portion of an optical link (e.g., leading to/from an optical cable) could be present in the form of silicon optical waveguide(s).

While the above is a full description of the specific embodiments, various modifications, alternative constructions and equivalents may be used. As an example, the AI accelerator apparatus and chiplet devices can include any combination of elements described above, as well as outside of the present specification. Therefore, the above description and illustrations should not be taken as limiting the scope of the present invention which is defined by the appended claims.

What is claimed is:

1. An AI Accelerator apparatus configured with in-memory compute, the apparatus comprising:
- a first substrate supporting,
- first N chiplets, where N is an integer greater than 1, each of the chiplets comprising a first plurality of tiles, and each of the tiles comprising:
- a first plurality of slices,
- a first central processing unit (CPU), and
- a first hardware dispatch device;
- a first plurality of die-to-die (D2D) interconnects;
- a first global reduced instruction set computer (RISC) interface coupled to each of the CPUs in each of the first tiles;

a first digital in memory compute (DIMC) matrix multiplier device configured within one or more portions of each of the first plurality of slices to allow for a high throughput of one or more matrix computations provided in the first DIMC;

a second substrate supporting, second N chiplets, where N is an integer greater than 1, each of the chiplets comprising a second plurality of tiles, and each of the tiles comprising:

a second plurality of slices, a second central processing unit (CPU), and a second hardware dispatch device;

a second plurality of die-to-die (D2D) interconnects;

a second global reduced instruction set computer (RISC) interface coupled to each of the CPUs in each of the second tiles;

a second digital in memory compute (DIMC) matrix multiplier device configured within one or more portions of each of the second plurality of slices to allow for a high throughput of one or more matrix computations provided in the second DIMC; and an active bridge module comprising a network of digital switches, a first plurality of ports in communication with a plurality of chiplets on the first substrate, and a second plurality of ports in communication with a plurality of chiplets on the second substrate, wherein in response to a first received input, the network of digital switches is dynamically configurable to a first state providing a first link between one or more of the first plurality of N chiplets on the first substrate, and one or more of the second plurality of N chiplets on the second substrate, in order to accommodate a tensor parallelism of a first type; and wherein in response to a second received input, the network of digital switches is dynamically configurable to a second state providing first and second links between one or more of the first plurality of N chiplets on the first substrate, and one or more of the second plurality of N chiplets on the second substrate, in order to accommodate a tensor parallelism of a second type.

2. The system of claim 1 wherein the active bridge module comprises:

an analog to digital converter in communication with the first link; and a digital to analog converter in communication with the first link.

3. The system of claim 1 wherein the active bridge module comprises:

a transmitter comprising a light source and an optical modulator in communication with the first link;

a receiver comprising a photodetector in communication with the first link; and the first link comprises an optical waveguide.

4. The system of claim 3 wherein the optical modular comprises a Mach Zehnder modulator.

5. The system of claim 3 wherein the first link comprises an optical cable.

6. The system of claim 3 wherein the first link comprises a silicon waveguide on the active bridge module.

7. The system of claim 1 wherein:

the first substrate is a first Peripheral Component Interconnect express (PCIe) card and includes a first PCIe bus; and the second substrate is a second Peripheral Component Interconnect express (PCIe) card and includes a second PCIe bus.

8. The system of claim 1 wherein the tensor parallelism of the first type is TP-2.

9. The system of claim 1 wherein the active bridge module is configured on a board.

10. The system of claim 1 wherein the tensor parallelism of the second type is TP-4.

11. The system of claim 1 further comprising a passive bridge module disposed on a board and providing a fixed link between one or more of the first plurality of N chiplets on the first substrate, and one or more of the second plurality of N chiplets on the second substrate.

12. A method comprising:

providing an input to an active bridge module present between a first substrate and a second substrate of an AI Accelerator apparatus configured with in-memory compute, the first substrate supporting, first N chiplets, where N is an integer greater than 1, each of the chiplets comprising a first plurality of tiles, and each of the tiles comprising:

a first plurality of slices, a first central processing unit (CPU), and a first hardware dispatch device;

a first plurality of die-to-die (D2D) interconnects;

a first global reduced instruction set computer (RISC) interface coupled to each of the CPUs in each of the first tiles;

a first digital in memory compute (DIMC) matrix multiplier device configured within one or more portions of each of the first plurality of slices to allow for a high throughput of one or more matrix computations provided in the first DIMC;

the second substrate supporting, second N chiplets, where N is an integer greater than 1, each of the chiplets comprising a second plurality of tiles, and each of the tiles comprising:

a second plurality of slices, a second central processing unit (CPU), and a second hardware dispatch device;

a second plurality of die-to-die (D2D) interconnects;

a second global reduced instruction set computer (RISC) interface coupled to each of the CPUs in each of the second tiles;

a second digital in memory compute (DIMC) matrix multiplier device configured within one or more portions of each of the second plurality of slices to allow for a high throughput of one or more matrix computations provided in the second DIMC, an active bridge module comprising a network of digital switches, a first plurality of ports in communication with a plurality of chiplets on the first substrate, and a second plurality of ports in communication with a plurality of chiplets on the second substrate, wherein in response to the received input, the network of digital switches is dynamically configurable to a first state providing a first link between at least one of the first plurality of N chiplets on the first substrate, and at least one of the second plurality of N chiplets on the second substrate, in order to accommodate a tensor parallelism of a first type; and wherein in response to a second received input, the network of digital switches is dynamically configurable to a second state providing first and second links between one or more of the first plurality of N chiplets on the first substrate, and one or more of the second plurality of N chiplets on the second substrate, in order to accommodate a tensor parallelism of a second type.

13. The method of claim 12 wherein the active bridge module comprises:

an analog to digital converter in communication with the first link; and a digital to analog converter in communication with the first link.

14. The method of claim 12 wherein the active bridge module comprises:

a transmitter comprising a light source and an optical modulator in communication with the first link;

a receiver comprising a photodetector in communication with the first link; and the first link comprises an optical waveguide.

15. The method of claim 14 wherein the optical modular comprises a Mach Zehnder modulator.

16. The method of claim 12 wherein:

the first substrate is a first Peripheral Component Interconnect express (PCIe) card and includes a first PCIe bus; and the second substrate is a second Peripheral Component Interconnect express (PCIe) card and includes a second PCIe bus.

17. The method of claim 12 wherein the tensor parallelism of the first type is TP-2.

18. The method of claim 12 wherein the active bridge module is configured on a board.

19. The method of claim 12 wherein the tensor parallelism of the second type is TP-4.

20. The method of claim 12 further comprising a passive bridge module disposed on a board and providing a fixed link between one or more of the first plurality of N chiplets on the first substrate, and one or more of the second plurality of N chiplets on the second substrate.

* * * * *